United States Patent
Peng et al.

(10) Patent No.: US 11,353,553 B2
(45) Date of Patent: Jun. 7, 2022

(54) MULTISENSOR DATA FUSION METHOD AND APPARATUS TO OBTAIN STATIC AND DYNAMIC ENVIRONMENT FEATURES

(71) Applicant: Huawei Technologies Co., Ltd., Shenzhen (CN)

(72) Inventors: Xueming Peng, Shenzhen (CN); Zhixuan Wei, Shenzhen (CN); Qi Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/353,017

(22) Filed: Jun. 21, 2021

(65) Prior Publication Data

US 2021/0311167 A1   Oct. 7, 2021

Related U.S. Application Data

(63) Continuation of application No. PCT/CN2019/129629, filed on Dec. 28, 2019.

(30) Foreign Application Priority Data

Dec. 29, 2018   (CN) .......................... 201811641186.3

(51) Int. Cl.
*G01S 7/41*   (2006.01)
*G01S 13/89*   (2006.01)
*G01S 13/86*   (2006.01)

(52) U.S. Cl.
CPC .............. *G01S 7/415* (2013.01); *G01S 13/89* (2013.01); *G01S 13/865* (2013.01)

(58) Field of Classification Search
CPC ......... G01S 7/415; G01S 13/89; G01S 13/865
See application file for complete search history.

(56) References Cited

U.S. PATENT DOCUMENTS

| 9,097,800 B1 | 8/2015 | Zhu |
| 9,612,123 B1 | 4/2017 | Levinson et al. |

(Continued)

FOREIGN PATENT DOCUMENTS

| CN | 101413806 A | 4/2009 |
| CN | 102323854 A | 1/2012 |

(Continued)

OTHER PUBLICATIONS

Miyasaka, T., et al., "Ego-Motion Estimation and Moving Object Tracking using Multi-layer LIDAR," 2009 IEEE, 6 pages.

(Continued)

*Primary Examiner* — Donald H B Braswell
(74) *Attorney, Agent, or Firm* — Conley Rose, P.C.

(57) ABSTRACT

A multisensor data fusion perception method includes receiving feature data from a plurality of types of sensors, obtaining static feature data and dynamic feature data from the feature data, constructing current static environment information based on the static feature data and reference dynamic target information, and constructing current dynamic target information based on the dynamic feature data and reference static environment information such that construction of a dynamic target and construction of a static environment are performed by referring to each other's construction results and the perception capability is for the dynamic target and the static environment that are in an environment in which the moving carrier is located.

20 Claims, 6 Drawing Sheets

(56) References Cited

U.S. PATENT DOCUMENTS

| | | | |
|---|---|---|---|
| 10,404,261 B1* | 9/2019 | Josefsberg | G01S 13/89 |
| 2003/0011507 A1* | 1/2003 | Kondo | G01S 13/04 |
| | | | 342/107 |
| 2017/0206436 A1 | 7/2017 | Schiffmann | |
| 2018/0082430 A1 | 3/2018 | Sharma et al. | |
| 2018/0225970 A1 | 8/2018 | Mitra et al. | |
| 2018/0261095 A1 | 9/2018 | Qiu et al. | |
| 2018/0307245 A1* | 10/2018 | Khawaja | B60W 30/00 |
| 2019/0016331 A1* | 1/2019 | Carlson | B60W 30/06 |
| 2020/0103523 A1* | 4/2020 | Liu | G01S 13/865 |

FOREIGN PATENT DOCUMENTS

| | | |
|---|---|---|
| CN | 202216696 U | 5/2012 |
| CN | 102564431 B | 11/2014 |
| CN | 105389984 A | 3/2016 |
| CN | 106908783 A | 6/2017 |
| CN | 106951879 A | 7/2017 |
| CN | 107202983 A | 9/2017 |
| CN | 108711163 A | 10/2018 |
| WO | 2017177650 A1 | 10/2017 |

OTHER PUBLICATIONS

"Road vehicles—Data communication between sensors and data; fusion unit for automated driving functions—Logical interface," TC 22/SC 31; ISO/CD 23150:2019(E),ISO/TC 22/SC 31/WG 9; Secretariat: DIN, Aug. 9, 2019, 209 pages.

\* cited by examiner

MULTISENSOR DATA FUSION METHOD AND APPARATUS TO OBTAIN STATIC AND DYNAMIC ENVIRONMENT FEATURES

CROSS-REFERENCE TO RELATED APPLICATIONS

This application is a continuation of International Patent Application No. PCT/CN2019/129629 filed on Dec. 28, 2019, which claims priority to Chinese Patent Application No. 201811641186.3 filed on Dec. 29, 2018. The disclosures of the aforementioned applications are hereby incorporated by reference in their entireties.

TECHNICAL FIELD

This application relates to signal processing, and in particular, to a multisensor data fusion method and apparatus.

BACKGROUND

Different sensors such as a camera, a millimeter-wave radar, and a laser radar have obvious differences in terms of a field of view (FOV), a detection distance, an identification capability, environment adaptability, and the like. Due to these differences, a single sensor cannot meet a requirement of continuous development of features of advanced driver-assistance systems (ADAS) and a requirement of continuous evolution of automatic driving.

To meet the requirement of the ADAS and the requirement of the automatic driving, data of a plurality of sensors needs to be fused to obtain perception information with higher confidence, high redundancy, and high complementarity. The high confidence indicates that data with sufficient confidence is provided through fusion of the data of the plurality of sensors in a case in which some information of a sensor is missing or measurement of a sensor is inaccurate in some dimensions. The high redundancy indicates that a processing model for the fusion of the data of the plurality of sensors may be compatible with the data of the plurality of sensors and has almost the same measurement results in some measurement dimensions, and redundancy is implemented in these measurement dimensions through the fusion of the data of the plurality of sensors. The high complementarity indicates that measurement results, sensed by the plurality of sensors in different environmental conditions and spatial features, can complement advantages and disadvantages of each other in some dimensions, to achieve perception performance that is difficult to achieve by the single sensor.

A current multisensor data fusion method is mainly used to detect, track, and fuse moving targets in an FOV, but it is difficult to sense a static obstacle. In addition, accuracy that is of perceiving a dynamic target and that is of the current multisensor data fusion method also needs to be improved.

Therefore, there is a problem that needs to be resolved. The problem is how to improve perception performance of multisensor data fusion, so that the multisensor data fusion has a better perception capability for both a static obstacle and a dynamic target.

SUMMARY

This application provides a multisensor data fusion perception method and a multisensor data fusion perception apparatus. Perception performance of multisensor data fusion can be improved based on the method and the apparatus.

According to a first aspect, a multisensor data fusion perception method is provided, used to fuse feature data collected by a plurality of types of sensors. The plurality of types of sensors are mounted on a moving carrier and are configured to observe a status of an environment in which the moving carrier is located. The status of the environment in which the moving carrier is located comprises current static environment information and current dynamic target information. The method includes receiving the feature data collected by the plurality of types of sensors, preprocessing the feature data, where the preprocessing includes performing data classification on the feature data, to obtain static feature data and dynamic feature data, obtaining reference dynamic target information, and constructing the current static environment information based on the static feature data and the reference dynamic target information, where the reference dynamic target information is obtained based on the dynamic feature data, or the reference dynamic target information is obtained based on the dynamic feature data and historical static environment information, obtaining reference static environment information, and constructing the current dynamic target information based on the dynamic feature data and the reference static environment information, where the reference static environment information is obtained based on the static feature data, or the reference static environment information is obtained based on the static feature data and historical dynamic target information, and outputting the current static environment information and the current dynamic target information.

In this application, when the current static environment information is constructed, not only the static feature data is used, but also the dynamic target information is referenced. Similarly, when the current dynamic target information is constructed, not only the dynamic feature data is used, but also the static environment information is referenced. In other words, construction of a dynamic target and construction of a static environment are performed by referring to each other's construction results. Because a construction process not only uses the feature data at a lower level, but also uses the construction result at a higher level (for example, the reference dynamic target information or the reference static environment information), perception performance of multisensor data fusion can be improved. Further, a perception capability of a moving carrier is improved. The perception capability is for the dynamic target and the static environment that are in the environment in which the moving carrier is located.

In a possible implementation, the feature data includes millimeter-wave radar detection data and non-millimeter-wave radar detection data, and performing data classification on the feature data includes performing the data classification on the millimeter-wave radar detection data, to obtain millimeter-wave radar dynamic detection data and millimeter-wave radar static detection data, and performing the data classification on the non-millimeter-wave radar detection data based on the millimeter-wave radar dynamic detection data and the millimeter-wave radar static detection data, to obtain dynamic non-millimeter-wave feature data and static non-millimeter-wave feature data.

The dynamic feature data includes the millimeter-wave radar dynamic detection data and the dynamic non-millimeter-wave feature data, and the static feature data includes the millimeter-wave radar static detection data and the static non-millimeter-wave feature data.

The millimeter-wave radar detection data includes dynamic data and static data, which is an advantage of a millimeter-wave radar. This advantage can be used, so that the millimeter-wave radar detection data is dynamically and statically divided to obtain the millimeter-wave radar dynamic detection data and the millimeter-wave radar static detection data. Then, based on the data with determined dynamic static attributes, the non-millimeter-wave radar detection data is associated. For example, if a given preset condition is met between a piece of non-millimeter-wave radar detection data and a piece of millimeter-wave radar dynamic detection data, it may be considered that the non-millimeter-wave radar detection data is also the dynamic feature data, or, if a given preset condition is not met between a piece of non-millimeter-wave radar detection data and a piece of millimeter-wave radar dynamic detection data, it may be considered that the non-millimeter-wave radar detection data is also the dynamic feature data. In this way, hierarchical dynamic and static data separation can more accurately and more quickly determine dynamic attributes and static attributes of a plurality of pieces of feature data, to obtain more accurate dynamic feature data and more accurate static feature data.

In a possible implementation, the reference dynamic target information includes a moving track of at least one another moving carrier. The other moving carrier includes another moving carrier that is in the environment in which the moving carrier is located and that is except the moving carrier. The current static environment information includes a current static raster map of the environment in which the moving carrier is located.

Constructing the current static environment information based on the static feature data and the reference dynamic target information includes performing coordinate system unification on the static feature data, to obtain static feature data in a same coordinate system, and performing local update on a historical static raster map based on the static feature data in the same coordinate system and a moving track of a first another moving carrier, to obtain the current static raster map. The local update includes updating a value of a target raster on the historical static raster map, and the target raster is a raster covered by the first another moving carrier. The first another moving carrier is any one of the at least one another moving carrier, and a static raster map is a data format used to describe static obstacle distribution in an environment.

Further, the target raster is a raster covered by the first another moving carrier at a historical time point, and the historical static raster map is also a raster map at the historical time point. If the historical static raster map is a static raster map at a time point t−1, the target raster is a raster that is covered by the first another moving carrier at the time point t−1.

Because when the current static raster map is constructed, not only the static feature data is used, but also the moving track of the other moving carrier is used, accuracy of the current static raster map is improved. For example, in a process of updating the value of the target raster on the historical static raster map at the time point t−1, because the target raster is the raster covered by the other moving carrier at the time point t−1, it is considered that a probability that the target raster is idle at a current time point is relatively high. Therefore, a relatively small probability value may be assigned to the target raster, and it is considered that there is a relatively low probability that an obstacle currently exists in the target raster. A value of each raster at the current time point is obtained, in other words, the static raster map at the current time point is constructed. Therefore, in this application, the current static environment information is constructed based on the reference dynamic target information. This adds input information of constructing the static environment, and improves accuracy of constructing the static environment information.

In a possible implementation, the plurality of types of sensors are further configured to observe a motion status of the moving carrier, and the motion status of the moving carrier includes a moving speed of the moving carrier.

Before constructing the current static environment information based on the static feature data and the reference dynamic target information, the method further includes performing, based on the moving speed of the moving carrier, global update on a value of each raster on a historical static raster map of the environment in which the moving carrier is located, to obtain an updated historical static raster map. The historical static raster map includes a static raster map at a previous time point of a current time point. When the previous time point is a start time point, the historical static raster map is an initial static raster map, and a value of each raster on the initial static raster map is a preset value.

Performing local update on a historical static raster map based on the static feature data in the same coordinate system and a moving track of a first another moving carrier, to obtain the current static raster map includes performing the local update on the updated historical static raster map based on the static feature data in the same coordinate system and the moving track of the first another moving carrier, to obtain the current static raster map.

The method provided in this implementation may be considered as a preset environment of constructing the current static raster map, namely, the global update. To be specific, the global update is performed on a raster probability of the historical static raster map. This update is essentially a process of attenuating a probability value of a raster. This update can reduce possible false detection in the static raster map, and improve the accuracy of the current static raster map.

In a possible implementation, the reference dynamic target information includes a moving track of another moving carrier, and the other moving carrier includes another moving carrier that is in the environment in which the moving carrier is located and that is except the moving carrier.

The current static environment information further includes road structure information in the environment in which the moving carrier is located.

Constructing the current static environment information based on the static feature data and the reference dynamic target information further includes constructing the road structure information based on the static feature data and the moving track of the other moving carrier.

In other words, the current static environment information may include the current static environment information, and may further include the road structure information. When the road structure information is constructed, not only the static feature data needs to be used, but also the reference dynamic target information is needed. This increases input information of constructing the road structure information, and improves accuracy of constructing the road structure information.

In a possible implementation, the reference static environment information includes the road structure information, and constructing the current dynamic target information based on the dynamic feature data and the reference static environment information includes constructing the current dynamic target information based on the dynamic feature data and the road structure information.

In other words, when the current dynamic target information is constructed, not only the dynamic feature data needs to be used, but also higher-level information, namely, the static environment information, needs to be used. The static environment information used herein is the road structure information, in other words, the current dynamic target information is constructed with reference to the road structure information. Therefore, accuracy of the current dynamic target information can be improved.

In a possible implementation, the road structure information includes a road edge, and constructing the current dynamic target information based on the dynamic feature data and the reference static environment information includes clustering the dynamic feature data, to obtain one or more clustering centers, where each clustering center is used to represent a possible dynamic target.

That an invalid clustering center in the one or more clustering centers is excluded based on the road structure information includes determining a clustering center located outside the road edge or a clustering center that overlaps the road edge as the invalid clustering center.

In this possible implementation, the one or more clustering centers obtained by clustering the dynamic feature data may be considered as immature dynamic targets, and an invalid dynamic target in these immature dynamic targets may be removed by referring to the road edge. For example, for an immature dynamic target that overlaps the road edge, because there is no vehicle or another moving carrier that rides on the road edge in reality, the immature dynamic target is considered as an invalid target.

Optionally, the road structure information may further include an object above the ground, for example, a road sign, an aerial billboard, or the like. Therefore, when an immature dynamic target appears above the object above the ground, for example, an unmanned aerial vehicle is above the object above the ground, because the dynamic target flying above the object above the ground does not affect a self-driving vehicle traveling on a road, the immature dynamic target may also be considered as an invalid target.

A remaining dynamic target is output as the current dynamic target information by identifying and removing an invalid target. For example, in an automatic driving scenario, the remaining dynamic target is considered as a vehicle or another moving carrier that currently travels on the road except an ego vehicle.

In this manner of constructing the current dynamic target through the reference static environment information, because not only the dynamic feature data at a lower level is considered, but also the static environment information at a higher level is considered, construction of the current dynamic target information is more accurate. In this way, perception performance can be improved.

In a possible implementation, before performing data classification on the feature data, the preprocessing further includes associating the feature data with a historical dynamic target, to obtain dynamic associated data, where the historical dynamic target is a dynamic target in an environment in which the moving carrier is located at the previous time point of the current time point, determining data that is in the feature data and that falls at a location at which the historical dynamic target is located as the dynamic associated data, and determining the dynamic associated data as the dynamic feature data.

Performing data classification on the feature data includes performing the data classification on feature data obtained after the dynamic associated data is filtered out.

Because observation of a sensor is continuous, a historical dynamic target may exist in a historically output perception result. If two other vehicles are observed at the time point t−1, the two other vehicles are historical dynamic targets. When the data classification is performed on new feature data observed by the sensor at the current time point, namely, a time point t, the new feature data may be first associated with the historical dynamic targets. When a preset condition is met between a piece of new feature data and a historical dynamic target, the new feature data may be considered as the dynamic feature data. In this manner, a part of dynamic feature data may be selected from a plurality of pieces of feature data. The part of data is labeled with the dynamic feature data, and is directly subsequently output as the dynamic feature data to construct dynamic target information. Dynamic and static feature data classification may be further performed, according to the method described above, on remaining data that is not labeled with the dynamic data.

In this manner, the data classification is performed. Because the historical dynamic target is considered, efficiency and accuracy of the data classification can be improved.

Optionally, before the data classification is performed through historical dynamic target association, or before dynamic and static data classification is performed through the millimeter-wave radar detection data described above, there is another possible implementation. The preprocessing further includes filtering the feature data, to filter out invalid data or noise data.

Performing data classification on the feature data includes performing the data classification on filtered feature data.

In this manner, the invalid data or the noise data is filtered out, to improve data availability. In this way, a better data basis for improving the perception performance is ensured.

In a possible implementation, the preprocessing includes performing the data classification on the feature data, to obtain the static feature data and the dynamic feature data. Undetermined data may also be obtained, and the undetermined data cannot be determined as static feature data or dynamic feature data.

In a possible implementation, the feature data includes millimeter-wave radar detection data and non-millimeter-wave radar detection data, and performing data classification on the feature data includes performing the data classification on millimeter-wave radar detection points, to obtain a millimeter-wave radar dynamic detection point, a millimeter-wave radar static detection point, and n millimeter-wave radar detection points that cannot be determined as millimeter-wave radar dynamic detection points or millimeter-wave radar static detection points, where n is a positive integer greater than or equal to 0, and performing the data classification on the non-millimeter-wave radar detection data based on the millimeter-wave radar dynamic detection point and the millimeter-wave radar static detection point, to obtain the dynamic non-millimeter-wave feature data, the static non-millimeter-wave feature data, and m pieces of non-millimeter-wave radar detection data that cannot be determined as non-millimeter-wave radar dynamic detection data or non-millimeter-wave radar static detection data, where m is a positive integer greater than or equal to 0.

The dynamic feature data includes the millimeter-wave radar dynamic detection point and the dynamic non-millimeter-wave feature data. The static feature data includes the millimeter-wave radar static detection point and the static non-millimeter-wave feature data. The undetermined data includes the n millimeter-wave radar detection points that cannot be determined as the millimeter-wave radar dynamic detection points or the millimeter-wave radar static detection points and the m pieces of non-millimeter-wave radar detection data that cannot be determined as the non-millimeter-wave radar dynamic detection data or the non-millimeter-wave radar static detection data.

In a possible implementation, the road structure information includes a road edge, and the constructing the current dynamic target information based on the dynamic feature data and the reference static environment information includes clustering the dynamic feature data and the undetermined data, to obtain one or more clustering centers, where each clustering center is used to represent a possible dynamic target.

That an invalid clustering center in the one or more clustering centers is excluded based on the road structure information, to obtain a to-be-determined dynamic target includes determining a clustering center located outside the road edge or a clustering center that overlaps the road edge as the invalid clustering center.

Optionally, after the to-be-determined dynamic target is obtained, the to-be-determined dynamic target is further excluded with reference to information about an object above the ground. If a preset condition is met between a to-be-determined dynamic target and the information about the object above the ground, it is considered that the to-be-determined dynamic target is an object above the ground. Therefore, the to-be-determined dynamic target is excluded, and a remaining to-be-determined dynamic target is determined as the current dynamic target information.

Optionally, after the current dynamic target information is determined, the current dynamic target information may be tracked, in other words, dynamic target tracking is performed. If a first dynamic target is no longer observed by the sensor in a subsequent first preset time period, the first dynamic target is suspended. If the first dynamic target is still not observed after a second preset time period, the first dynamic target is deleted. If the first dynamic target is observed again after a third preset time period, the first dynamic target is restored to the current dynamic target. Herein, the first preset time period, the second preset time period, and the third preset time period may all be empirical values. A relationship between the three preset time periods is not specially limited, and may be pairwise identical or different. The first dynamic target is any one of a plurality of dynamic targets represented by the current dynamic target information.

According to a second aspect, a multisensor data fusion perception apparatus is provided. The multisensor data fusion apparatus includes modules configured to perform the method in the first aspect.

According to a third aspect, a multisensor data fusion perception apparatus is provided. The multisensor data fusion perception apparatus includes a memory configured to store a program, and a processor configured to execute the program stored in the memory. When the program stored in the memory is executed, the processor is configured to perform the method in the first aspect.

According to a fourth aspect, a computer-readable medium is provided. The computer-readable medium stores program code to be executed by a device, and the program code includes an instruction used to perform the method in the first aspect.

According to a fifth aspect, a computer program product including an instruction is provided. When the computer program product runs on a computer, the computer is enabled to perform the method in the first aspect.

According to a sixth aspect, a chip is provided. The chip includes a processor and a data interface, and the processor reads, through the data interface, an instruction stored in a memory, to perform the method in the first aspect.

Optionally, in an implementation, the chip may further include the memory. The memory stores the instruction, the processor is configured to execute the instruction stored in the memory, and when executing the instruction, the processor is configured to perform the method according to the first aspect.

According to a seventh aspect, a mobile terminal is provided. The mobile terminal includes the multisensor data fusion perception apparatus according to any one of the second aspect or the third aspect.

DESCRIPTION OF EMBODIMENTS

Figure 1:
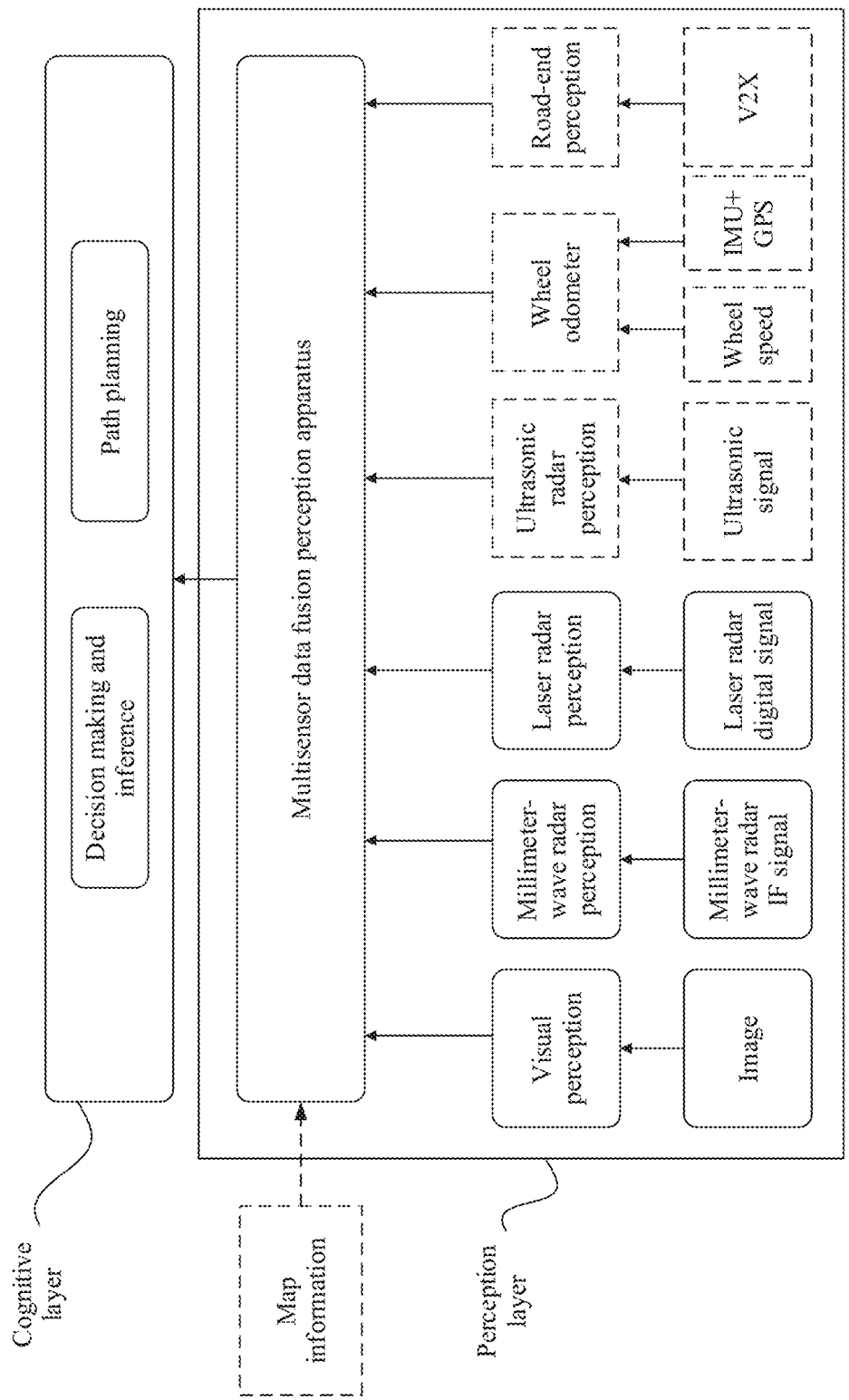
FIG. 1 is a system architecture of an application scenario according to an embodiment of this application.

The following describes technical solutions of this application with reference to accompanying drawings.

A multisensor data fusion method in embodiments of this application can be applied to a self-driving vehicle, a robot, complex industrial process control, medical diagnosis, image processing, and another scenario in which multisensor perception needs to be performed. In the embodiments of this application, an application scenario of a self-driving vehicle is used as an example to describe the technical solutions.

The following briefly describes the self-driving vehicle and a related architecture of the self-driving vehicle.

A self-driving vehicle is referred to as a motor vehicle auto driving system, is also referred to as an unmanned vehicle, and is an intelligent vehicle system that implements unmanned driving through a vehicle-mounted computer system. The self-driving vehicle relies on collaborations such as artificial intelligence, visual computing, radar, a monitoring device, and a global positioning system, so that a computer can automatically and securely operate a motor vehicle without any human active operation.

An architecture of a self-driving vehicle is usually divided into three layers: a perception layer, a cognitive layer, and an execution layer.

The perception layer includes perception and fusion, and is used to replace or assist a driver in obtaining input information. The input information includes, for example, a motion status of the vehicle and a status of an environment around the vehicle, for example, a motion status of another vehicle, road condition information, a status of a traffic signal light, a road structure (for example, a road edge), a status of a lane line, a status of another obstacle, or the like. When being used to assist the driver, the perception layer may further include status information of the driver (for example, a driver fatigue state and the like).

The cognitive layer includes decision making and inference, and planning, and is used to replace or assist a driver in obtaining information such as an expected vehicle speed and a driving route based on information obtained by the perception layer, given decision logic, and a given planning algorithm. The information is converted into a specific control instruction and delivered to the execution layer.

The execution layer is used to execute the control instruction delivered by the cognitive layer, to control the vehicle.

The multisensor data fusion perception method provided in this embodiment of this application may be applied to the perception layer of the self-driving vehicle. The method is used to fuse feature data of a plurality of types of sensors, to better sense a motion status of an ego vehicle and a status of an environment in which the ego vehicle is located. In this way, related information sensed by eyes and a sense of the driver is replaced. When being used on a vehicle with an assistant driving function, the method may also be used to assist and supplement the related information sensed by the eyes and the sense of the driver. The status of the environment in which the ego vehicle is located includes static environment information and moving target information that are in the environment in which the ego vehicle is located. The moving target information includes motion state information of another vehicle in the environment in which the ego vehicle is located.

This application provides a new multisensor data fusion perception method and apparatus, to combine construction of static environment information and construction of dynamic target information to assist each other. In this way, more accurate dynamic environment information and more accurate dynamic target information are obtained, and a more accurate perception effect is achieved.

FIG. 1 is a system architecture of an application scenario according to an embodiment of this application.

As shown in FIG. 1, a plurality of sensors of different types obtain feature data of different levels as input of a multisensor data fusion perception apparatus. For example, an image obtained by a visual sensor is processed by visual perception to obtain visual-related feature data, such as a visual target, a lane line, a speed limit plate, and a traffic light. Millimeter-wave radar intermediate frequency (IF) signal obtained by a millimeter-wave radar is processed by the millimeter-wave radar, to obtain a millimeter-wave radar detection point. A laser radar digital signal obtained by laser radar is processed by the laser radar through perception, to obtain a laser radar detection point, for example, an original point cloud of the laser radar, and the like. The multisensor data fusion perception apparatus fuses the feature data through the fusion perception method provided in the following embodiments or implementations of this application. In this way, perception of a static environment status and another dynamic target in an environment in which an ego vehicle is located is implemented.

The perceived information is further output to a cognitive layer for decision making and inference, and/or path planning, may be output to a human-computer interaction interface for presenting a perception result to a user, or may be output to a positioning system for positioning or image composition. Due to space limitation, FIG. 1 shows only one example. As optional data information, map information may be used by the multisensor data fusion perception apparatus to enrich a perception result of the map information.

The following describes the multisensor data fusion perception apparatus and method in the embodiments of this application.

Figure 2:
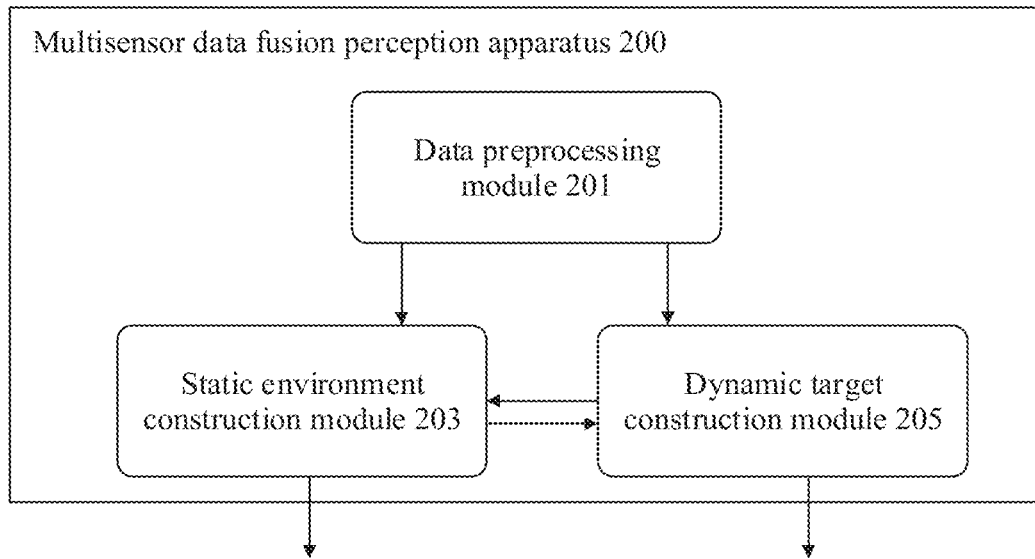
FIG. 2 is a schematic structural diagram of a multisensor data fusion perception apparatus according to an embodiment of this application.

First, as shown in FIG. 1, a plurality of types of sensors transfer a plurality of types of feature data obtained by the plurality of types of sensors to the multisensor data fusion perception apparatus. As shown in FIG. 2, the multisensor data fusion perception apparatus 200 includes a data preprocessing module 201, a static environment construction module 203, and a dynamic target construction module 205. The data preprocessing module 201 is configured to preprocess a plurality of types of received or obtained feature data. The static environment construction module 203 is configured to construct static environment information. The dynamic target construction module 205 is configured to construct dynamic target information. It should be noted that the static environment information herein is status information of an environment in which an ego vehicle travels, and the status information includes a road structure and the like. The dynamic target information herein is moving status information of another moving carrier except the ego vehicle, and the moving status information includes a location, a driving speed, a pose, and the like of another vehicle.

It should be noted that, because a perception process of a self-driving vehicle or the other moving carrier is usually continuous, the perception process embodied in the foregoing several modules is continuous. For example, a process of constructing the static environment information by the static environment construction module 203 is continuous, and the process includes constructing static environment information at each current time point. When a next time point arrives, the current time point becomes a historical time point, but static environment information at the historical time point is usually used as an important basis to construct static environment information at the next time point. In this embodiment of this application, for brevity of description, if a specific time point of the static environment information is not emphasized, and no special description is provided, it may be considered that the static environment information mentioned below is the static environment information at the current time point. Similarly, for the dynamic target construction module 205 and the data preprocessing module 201, details are not described herein again. The following describes the plurality of types of feature data collected by the plurality of types of sensors mentioned above. Each type of data usually includes a plurality of pieces of feature data, in other words, the feature data should be presented in a complex number manner. However, for brevity, a quantity of pieces of data is not intentionally emphasized in this specification, and this should be understood by a person skilled in the art. After all, individual data is difficult to use.

As shown in Table 1, the plurality of types of feature data may include the following types of data: a laser radar detection point from laser radar, a millimeter-wave radar detection point from a millimeter-wave radar, edge information that is of vision freespace and that is from a visual sensor, and the like. Specific representation forms of the data are shown in the following table.

TABLE 1

| Feature data of a sensor | Representation forms of the feature data of the sensor | Remarks |
|---|---|---|
| Laser radar detection point | x, y, z | Location of the detection point |
| | l | Layer number of a scanning line to which the detection point belongs |
| | w | Echo width |
| | e | Echo number |
| Millimeter-wave radar detection point | x, y, z | Location of the detection point |
| | xrms, yrms, zrms | Root mean square of a location error of the detection point |
| | rcs | Reflected cross-sectional area |
| | vr | Radial velocity |
| Edge information of vision freespace | x, y | Location of an edge point |
| | c | Type of the edge point |

The visual sensor may further obtain related information such as a visual target, a speed limit plate, and a traffic light. The visual sensor includes a camera, for example, an infrared camera and a visible light camera. In this embodiment of this application, the visual sensor is an optional sensor. To be specific, if multisensor data fusion is not performed based on data from the visual sensor, precision of the perception result is affected, but implementation of the solution in this embodiment of this application is not affected.

For ease of understanding, it should be noted that, the detection point is described below by a "detection point" or a representation form "feature data" of the detection point. For example, the millimeter-wave radar detection point may be described as millimeter-wave feature data or millimeter-wave radar feature data. As shown in Table 1, the "feature data" is a specific representation form of the "detection point" or visual detection information. Differences in expressions do not affect essence of content.

The following describes a method performed by each module in the multisensor data fusion perception apparatus 200 and a relationship between the modules.

First, that the data preprocessing module 201 preprocesses the plurality of types of obtained feature data may include the following steps.

Step S2011: Filter feature data of a plurality of sensors.

An objective of this step may be to filter out invalid data, and different filtering methods are used for feature data of different sensors.

For example, for the laser radar detection point, a ground point, a raindrop point, and an abnormal point need to be removed. An example of a determining method of the ground point, the raindrop point, and the abnormal point is as follows: (1) The detection point is converted into an earth-surface coordinate system based on calibration information and vehicle status information, and a point whose height is less than a threshold (usually 0.05 meters (m)) is considered as the ground point. (2) For a multi-echo laser radar, a laser beam has a plurality of echoes, and if an echo width of a non-last echo is less than 1 m (an empirical value), the echo is the raindrop point. (3) A distance between each point and a nearest point of the point is calculated, and if the distance is five times greater than resolution, the point is the abnormal point.

For the millimeter-wave radar detection point, if a radar cross-section (RCS) is less than a threshold (an empirical value is −32 decibels per square meter (dBsm)), and a location error root mean square (RMS) is greater than a threshold (an empirical value is 1.1 m), the point is removed. Then, the abnormal point is removed in a same manner of the laser radar.

For the feature data collected by the visual sensor, feature data of a current frame and feature data of previous three frames may be averaged, to suppress transition.

Step S2012: Dynamic and static feature data separation: preliminarily filter dynamic feature data by associating with a historical dynamic target.

As described above, the perception process is continuous. For example, dynamic targets output by a perception result at a previous time point is considered as historical dynamic targets at the current time point, and these historical dynamic targets are subsequently continuously observed for updating and management. This part of work is not described in this application; however, these historical dynamic targets also have an important reference function for constructing the dynamic target information at the current time point. For example, in step S2012, these historical dynamic targets may be used to associate feature data at the current time point. A specific process is described below.

First, an attribute of a dynamic target detected by the sensor at the current time point is predicted based on the current time point for detecting of the sensor and an attribute (for example, a location and a speed) of the historical dynamic target. For example, at a current time point t, an attribute of a historical dynamic target at a historical time point t−1, for example, a location and a speed of the historical dynamic target, needs to be predicted, to obtain a predicted historical dynamic target. The predicted historical dynamic target includes a predicted location and a predicted speed of the historical dynamic target at the current time point t. The predicted historical dynamic target is used for historical dynamic association below.

Then, for each piece of feature data, a distance between the feature data and the predicted historical dynamic target is calculated. The distance may be a Euclidean distance or a Mahalanobis distance. When the distance is less than a preset threshold, it may be considered that the feature data is associated with the historical dynamic target. When the distance is greater than the preset threshold, it may be considered that the feature data is not associated with the historical dynamic target. In this manner, it may be determined whether each of the plurality of types of feature data is associated with the historical dynamic target. A specific association method may include calculating a distance $d_{i,j}$ between feature data i and each existing predicted historical dynamic target j. For the feature data i, if $$\min_j d_{i,j} \leq d_t,$$

it is considered that the feature data i is successfully associated with the target j. $d_t$ is a preset threshold (the threshold may be five times the resolution of a sensor to which the feature data belongs). For the feature data i, if all historical dynamic targets j satisfies: $d_{ij} > d_t$, association fails, in other words, no association is performed.

If the association succeeds, the feature data is marked as the dynamic feature data. If the association fails, the feature data is not marked as the dynamic feature data, but is sent to step S2013 for further dynamic and static feature data separation.

Step S2013: Dynamic and static feature data separation: perform the dynamic and static feature data separation on a millimeter-wave radar detection point.

Because the millimeter-wave radar can detect a radial velocity (for example, vr shown in Table 1), the millimeter-wave radar detection point is feature data with a dynamic attribute and a static attribute itself. The radial velocity is a component of a velocity that is of a detected target object relative to the sensor and that is on a connection line between the target and the sensor.

Table 2 shows variables that need to be used in a calculation process of determining dynamic data and static data through the millimeter-wave radar detection point.

TABLE 2

| Variables | Description |
|---|---|
| b | y coordinate of an installation position of a millimeter-wave radar |
| l | x coordinate of an installation position of the millimeter-wave radar |
| β | Included angle between a positive direction of the millimeter-wave radar and an x axis of a vehicle body coordinate system |
| v | Vehicle linear velocity |
| ω | Vehicle angular velocity |
| $θ_i$ | Included angle between the positive direction of the millimeter-wave radar and a connection line between a target i detected by the millimeter-wave radar and a sensor |
| $v_{r,i}$ | Radial velocity of the target i detected by the millimeter-wave radar |
| $v_i$ | Velocity vector generated at the installation position of the millimeter-wave radar in vehicle movement |
| α | Included angle between the positive direction of the millimeter-wave radar and the velocity vector of the installation position of the millimeter-wave radar |
| $v_g$ | It is assumed that an included angle between the positive direction of the millimeter-wave radar and a connection line between a stationary target and the sensor is e, therefore, a theoretical radial velocity of the stationary target is $v_g$ |
| $v_t$ | Judgment threshold is usually twice the speed resolution of the millimeter-wave radar | b, l, β, v, ω, and $v_{r,i}$ are inputs. $v_s$ and α are intermediate variables, and a calculation method may be shown as follows:

The included angle α between the positive direction of the millimeter-wave radar and the velocity vector of the installation position of the millimeter-wave radar is calculated based on installation positions (b, l, β) of the millimeter-wave radar and motion statuses (v, ω) of the ego vehicle:

$$\alpha = \operatorname{atan}\left(\frac{l\omega}{v - b\omega}\right) - \beta.$$

At the same time, the velocity vector $v_s$ generated at the installation position of the millimeter-wave radar is calculated based on the installation positions (b, l, β) of the millimeter-wave radar and the motion statuses (v, ω) of the ego vehicle:

$$v_s = \sqrt{(wl)^2 + (v - bw)^2}.$$

Then, it is assumed that a target is static. A radial velocity $v_θ$ of the target relative to the millimeter-wave radar is calculated based on α, $v_s$, and an included angle $θ_i$ of each target:

$$v_{θ,i} = -\cos(θ_i - α)v_s.$$

Then, if $|v_{θ,i} - v_{r,i}| > v_t$, feature data i is the dynamic feature data, otherwise, the feature data i is the static feature data.

It should be noted that the ego vehicle described herein is a carrier vehicle of the millimeter-wave radar. The target described herein is another moving carrier or a static obstacle except the ego vehicle.

The foregoing provided calculation method may be used as an example of determining the dynamic feature data and the static feature data based on the millimeter-wave radar detection point, and is not used as a limitation to this application. Other algorithms based on this concept are not listed one by one.

Because Doppler measurement characteristics of a millimeter-wave radar sensor determine that the millimeter-wave radar sensor can accurately determine a motion status of the ego vehicle or another moving target, the dynamic and static feature data separation can be performed on the millimeter-wave radar detection point through the foregoing steps. However, another non-millimeter-wave radar sensor such as a visual sensor and a laser radar sensor cannot directly obtain a motion status of a measured target, in other words, non-millimeter-wave radar feature data cannot be directly determined as the dynamic feature data or the static feature data.

Therefore, after a moving state and a static state of millimeter-wave radar detection points are determined in step S2013, a part of millimeter-wave radar detection points is marked as the dynamic feature data, and a part of millimeter-wave radar detection points is marked as the static feature data. In some cases, a part of millimeter-wave radar detection points is not marked as the static feature data or the dynamic feature data. This part of data and data of another sensor other than the millimeter-wave radar may enter step S2014 for further processing, or may not be processed in step S2014. Instead, this part of data, used as undetermined data, subsequently enters the static environment construction module 203 and the dynamic target construction module 205 for processing.

Step S2014: Dynamic and static feature data separation: perform the dynamic and static feature data separation on non-millimeter-wave radar feature data based on dynamic millimeter-wave radar feature data and static millimeter-wave radar feature data that are obtained in step S2013 through determining.

A dynamic attribute and a static attribute of the non-millimeter-wave radar feature data may be further determined based on an association relationship between the non-millimeter-wave radar feature data and the marked dynamic feature data. For example, this may be implemented through the following method.

First, feature data detected by all sensors is converted into a vehicle body coordinate system of an ego vehicle. Then, a Euclidean distance between feature data detected by the millimeter-wave radar and feature data detected by a sensor, for example, a non-millimeter-wave radar is calculated. When a distance between the non-millimeter-wave radar feature data and the dynamic millimeter-wave radar feature data is less than a preset threshold, the non-millimeter-wave radar feature data is determined as the dynamic feature data. Otherwise, the non-millimeter-wave radar feature data is the static feature data. Alternatively, when a distance between the non-millimeter-wave radar feature data and the static millimeter-wave radar feature data is less than a preset threshold, it is determined that the non-millimeter-wave radar feature data is the static feature data.

A specific association method is as follows:

First, the feature data detected by the millimeter-wave radar and feature data detected by another non-millimeter-wave sensor are converted into the vehicle body coordinate system.

It is assumed that an installation position of the sensor in the vehicle body coordinate system of the ego vehicle is $(x_t, y_t)$ and an angle is $\theta$. Coordinates of the sensor are $(x_t, y_t, \theta)$. An algorithm for converting an original data location $(x_s, y_s)$ of the sensor into a location $(x_v, y_v)$ of the vehicle body coordinate system of the ego vehicle is:

$$[x_v, y_v, 1]^T = T_s^v [x_s, y_s, 1]^T.$$

$[x_v, y_v, 1]$ on the left of the formula is coordinates of the sensor after being converted into the vehicle body coordinate system of the ego vehicle. $[x_s, y_s, 1]$ on the right of the formula is original coordinate data of the sensor. A conversion matrix $T_s^v$ is:

$$T_s^v = \begin{bmatrix} \cos\theta & -\sin\theta & x_t \\ \sin\theta & \cos\theta & y_t \\ 0 & 0 & 1 \end{bmatrix}.$$

Then, a distance $d_{i,j}$ between feature data i detected by another sensor and a closest dynamic millimeter-wave radar feature data point j is calculated, and the distance may be a Euclidean distance. It is assumed that feature data detected by the laser radar is $(x_{l,i}, y_{l,i}, z_{l,i})$, and the dynamic millimeter-wave radar feature data is $(x_{r,j}, y_{r,j}, z_{r,j})$.

The Euclidean distance between the feature data detected by the laser radar and the dynamic millimeter-wave radar feature data is $d_{i,j} = \sqrt{(x_{l,i}-x_{r,j})^2 + (y_{l,i}-y_{r,j})^2 + (z_{l,i}-z_{r,j})^2}$. It is assumed that feature data detected by the visual sensor is $(x_{f,i}, y_{f,i})$ and the dynamic millimeter-wave radar feature data is $(x_{r,j}, y_{r,j}, z_{r,j})$. The Euclidean distance between the feature data detected by the laser radar and the dynamic millimeter-wave radar feature data is $d_{i,j} = \sqrt{(x_{l,i}-x_{r,j})^2 + (y_{l,i}-y_{r,j})^2}$. If the distance $d_{i,j} \leq d_t$, where $d_t$ is a preset threshold, and the threshold may be usually five times the resolution of the sensor, it is considered that the feature data i can be associated with the dynamic millimeter-wave radar feature data point j, in other words, the feature data i is also the dynamic feature data, otherwise, the feature data i is sent to a next step for further determining.

Certainly, the dynamic attribute and the static attribute of the non-millimeter-wave radar feature data may be further determined based on an association relationship between the non-millimeter-wave radar feature data and marked static millimeter-wave radar feature data. For a specific method, refer to the method for associating the non-millimeter-wave radar feature data with the dynamic millimeter-wave radar feature data. Details are not described herein again.

Figure 3:
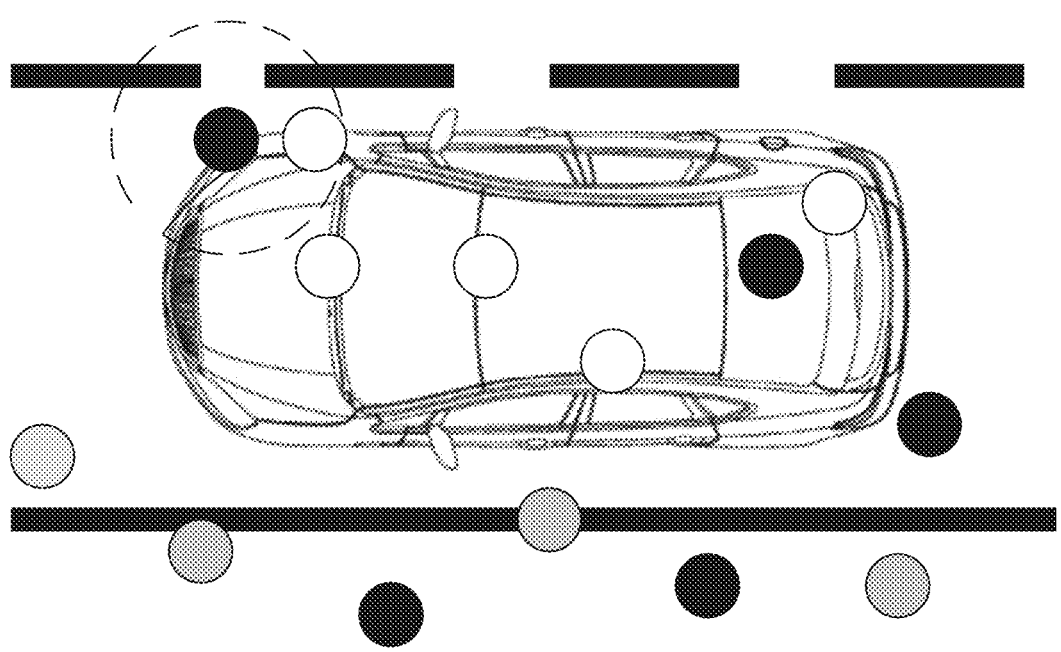
FIG. 3 is a schematic diagram of a method for performing data classification based on millimeter-wave radar detection data according to an embodiment of this application.

For better understanding of step S2014, refer to FIG. 3.

As shown in FIG. 3, both a gray dot and a white dot are the feature data detected by the millimeter-wave radar. The gray dot is a detection point that is marked as the static feature data and that is in the millimeter-wave radar detection points, namely, the static millimeter-wave radar feature data. The white dot is a detection point that is marked as the dynamic feature data and that is in the millimeter-wave radar detection points, namely, the dynamic millimeter-wave radar feature data. A black dot is a detection point detected by the laser radar (in FIG. 3, only the laser radar is used as an example). A dashed circle represents an area that is around a preset radius and in which a detection point detected by the laser radar is used as a center of the circle. If the area includes a detection point that is marked as motion feature data and that is in the millimeter-wave radar detection points, the laser radar detection point is the dynamic feature data.

In this case, preprocessing work in this embodiment of this application is basically completed, and data marked as the dynamic feature data and the static feature data is obtained. There may also be the undetermined data, in other words, feature data that is not determined as the dynamic feature data or the static feature data. It should be noted herein that although processing is performed by the data preprocessing module 201, a part of data may still fail to be determined as the dynamic feature data or the static feature data, and this part of data is the undetermined data. In this embodiment of this application, this part of undetermined data may enter the static environment construction module 203 together with the static feature data, and is used to construct a static environment. In addition, this part of undetermined data may also enter the dynamic target construction module 205 together with the dynamic feature data, and is used to construct a dynamic target. In other words, the undetermined data may enter a subsequent processing process together with the static feature data and the dynamic feature data, and is used to construct the static environment information or the dynamic target information. The undetermined data, used as optional data, is not directly reflected in the following description, and the undetermined data is reflected in some possible implementations or some optional embodiments, but should not be used as a limitation on input data.

It should be noted that, in this embodiment of this application, both step S2011 and step S2012 are optional steps, in other words, the dynamic and static data separation in step S2013 and the dynamic and static data separation in step S2014 are directly performed on the plurality of types of feature data obtained by the plurality of types of sensors. Correspondingly, if step S2011 is not performed, errors of a part of data are increased because some invalid data is not filtered out. If step S2012 is not performed, a part of dynamic feature data that is obtained, through association, based on the historical dynamic target is lost. Data in this part of data may be identified by step S2013 and step S2014, or may not be identified by step S2013 and step S2014. However, a lack of step S2011 and step S2012 causes only a partial loss in precision, and does not affect an implementation of the technical solutions provided in the embodiments of this application.

As described above, after preprocessing, the static feature data, the dynamic feature data, and the undetermined data are obtained, and these data is used for subsequent processing. As shown in FIG. 2, the static feature data is output from the module 201 to the module 203, and the dynamic feature data is output from the module 201 to the module 205. It should be noted that an arrow pointing from the module 203 to the module 205 is used to indicate that the static environment information constructed by the module 203 is output to the module 205 as reference static environment information, and is used by the module 205 to construct the dynamic target based on the dynamic feature data and the reference static environment information. Similarly, an arrow pointing from the module 205 to the module 203 is used to indicate that the dynamic target information constructed by the module 205 is output to the module 203 as reference dynamic target information, and is used by the module 203 to construct the static environment based on the static feature data and the reference dynamic target information.

In other words, the static environment construction module 203 needs to use output information of the dynamic target construction module 205, and similarly, the dynamic target construction module 205 also needs to use output information of the static environment construction module 203. The two modules may obtain corresponding data from the data preprocessing module 201 at the same time, and construct the static environment and the dynamic target at the same time. Alternatively, the static environment construction module 203 may construct the static environment information in advance based on the static feature data and the reference dynamic target information, and output the static environment information as the reference static environment information to the dynamic target construction module 205. Therefore, the dynamic target construction module 205 constructs the dynamic target information with reference to the reference static environment information and the dynamic feature data. The dynamic target information may be further used as new reference dynamic target information and output to the static environment construction module 203. The dynamic target information is used by the static environment construction module 203 to construct static environment information at a next time point based on the new reference dynamic target information and static feature data at the next time point.

Alternatively, the solution may be as follows. The dynamic target construction module 205 constructs the dynamic target information in advance based on the dynamic feature data and the reference static environment information, and outputs the dynamic target information as the reference dynamic target information to the static environment construction module 203. Therefore, the static environment construction module 203 constructs the static environment information based on the reference dynamic target information and the static feature data. The static environment information may be further used as new reference static environment information and output to the dynamic target construction module 205. The static environment information is used by the dynamic target construction module 205 to construct dynamic target information at the next time point based on the new reference static environment information and dynamic feature data at the next time point.

A key idea of this embodiment of this application is that the static environment construction module 203 and the dynamic target construction module 205 mutually use the output information of each other. To be specific, both the static feature data and the dynamic target information need to be used for construction of the static environment, and both the dynamic feature data and the static environment information need to be used for construction of the dynamic target. In other words, during the construction of the static environment, a situation of the dynamic target needs to be considered comprehensively, and during the construction of the dynamic target, a situation of the static environment also needs to be considered comprehensively.

In addition, the module 203 and the module 205 may further simultaneously perform construction at the current time point by using output information at the previous time point of each other, or may sequentially perform the construction. This is not limited in this application.

The following describes, in detail, work of the static environment construction module 203 and work of the dynamic target construction module 205.

Input information of the static environment construction module 203 may include the static feature data and a moving track of a moving target. The moving track of the moving target is output by the dynamic target construction module 205, and is used as the reference dynamic target information and used by the static environment construction module 203 to construct the static environment.

The output information of the static environment construction module 203 is static environment information. The static environment information may include a static raster map at the current time point and road structure information. The road structure information may include a road edge (an isolation belt, or the like) and an object above the ground (a road sign, an advertising sign above the ground, an overcrossing, or the like).

Figure 4:
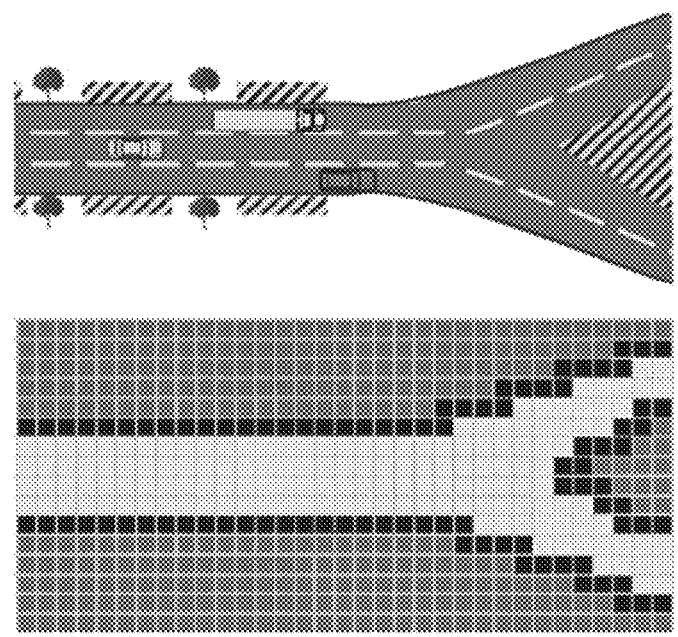
FIG. 4 is a schematic diagram of a static raster map according to an embodiment of this application.

The module 203 may be configured to implement two parts: construction of a static raster map in step S2031 and estimation of a road structure in step S2032. As shown in FIG. 4, the static raster map is a data format that describes distribution of static obstacles in an environment.

The upper part of FIG. 4 is an actual Y-shaped branch, and the lower part is a corresponding static raster map. It should be noted that only a static obstacle is displayed on the static raster map. A vehicle in the upper part is a dynamic target and is not displayed on the static raster map. On the static raster map, an environment is divided into horizontally and vertically arranged rasters based on a given proportional size. A color depth of each raster indicates a probability that an area corresponding to the raster is occupied by the static obstacle. A deeper color indicates a higher probability that the area is occupied. A black color indicates that the probability that the raster is occupied by the obstacle is 1. A white color indicates that the probability that the raster is occupied by the obstacle is 0, that is, the raster is idle. A gray color indicates that the probability that the raster is occupied by the obstacle is 0.5, and this usually indicates an unknown state.

The static raster map is represented by a probability raster map. Each raster in the probability raster map includes three attribute values an accumulated value (odd), a probability value (prob), and a temporary occupation value. Both the accumulated value and the probability value indicate a probability that the raster includes the obstacle, and there is a one-to-one correspondence between the accumulated value and the probability value. Further, the correspondence between the accumulated value and the probability value, or referred to as a conversion relationship, is as follows:

$$\text{odd} = \log\left(\frac{prob}{1-prob}\right); prob = \frac{e^{odd}}{1+e^{odd}}.$$

Figure 5:
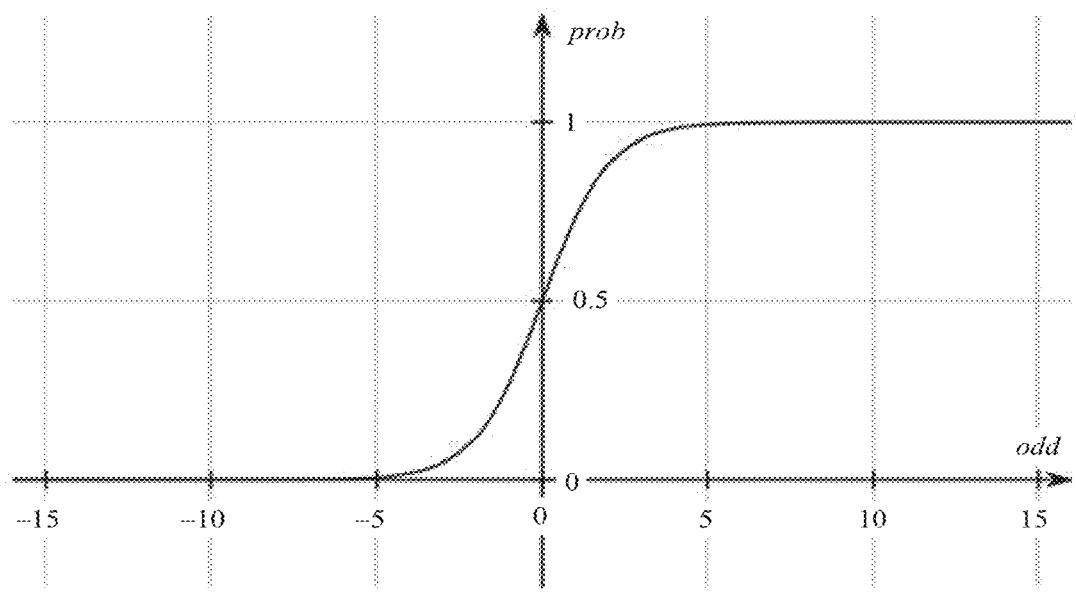
FIG. 5 is a schematic diagram of a relationship between a cumulative value and a probability value that are of a raster on a static raster map according to an embodiment of this application.

The correspondence between the accumulated value (odd) and the probability value (prob) is shown in Table 3 and FIG. 5.

Table 3 Relationship between an accumulated value and a probability value

TABLE 3

| Raster colors | Accumulated values (odd) | Probability values (prob) |
| --- | --- | --- |
| Black | 50 | 1 |
| Gray | 0 | 0.5 |
| White | −50 | 0 |

A value range of odd is [−50,50]. A higher odd indicates a higher occupation probability, and a lower odd indicates a higher idle probability. odd=0 indicates that a state is unknown. A value range of a corresponding prob is [0,1]. A higher prob indicates a higher occupation probability, and a lower prob indicates a higher idle probability. prob=0.5 indicates that a state is unknown.

The temporary occupation value indicates whether there is, in data of the sensor at the current time point, an obstacle in the area corresponding to the raster. Usually, the temporary occupation value is 0 or 1. 0 indicates that there is no obstacle, and 1 indicates that there are the obstacles.

The following describes specific steps of step S2031. In summary, the steps include coordinate conversion in step S2031a, and a partial raster probability update in step S2031b.

Before step S2031 is described, an optional module needs to be described first. The optional module is a global update module 202. Input information of the global update module 202 includes a moving speed of the ego vehicle and a historical static raster map. The global update module 202 is configured to update a probability value of each raster in the historical static raster map based on the moving speed of the ego vehicle, to obtain an updated historical static raster map. The updated historical static raster map is used by the module 203 as the historical static raster map to perform an operation in step S2031b.

Further, the global update module 202 is configured to perform step S2021: an adaptive global raster probability update.

The following describes the adaptive global raster probability update in step S2021, including a cause, a scenario example, a calculation method, and an attenuation effect that are of the global raster probability update.

First, it should be noted that, the so-called adaptive global raster probability update is continuously performed as time goes by, and is to continuously iteratively update the historical static raster map, including updating an accumulated value and a probability value that are included in each raster in the historical static raster map. The historical static raster map is used to represent a static raster map before the current time point.

The global raster probability update needs to be updated because a false alarm phenomenon exists when a sensor detects a target and an accumulated value of a historical raster needs to be gradually reduced to reduce impact of a false alarm. Therefore, the global raster probability update needs to be performed in each round of calculation. In other words, a purpose of this step is that false detection of the sensor occurs occasionally and does not occur continuously. As the global raster probability update is performed, the false detection that occurs occasionally will be forgotten. Because a correct detection result will be updated continuously, the correct detection result is saved in the static raster map.

For example, a visual sensor of a self-driving vehicle traveling on a highway at night may detect that a static shadow projected on the highway by a high-pole street lamp beside the highway is a fixed road barrier. Actually, the static shadow is not the fixed road barrier. In this case, this is the false alarm. In this scenario, the self-driving vehicle needs to take a detour or perform emergency braking to avoid the road barrier. However, this is actually unnecessary. Usually, when weather or light is abnormal, a visual sensor or a radar sensor installed on a vehicle-mounted device detects an obstacle by mistake even though there is no obstacle in front of the self-driving vehicle. As a result, the self-driving vehicle performs the emergency braking, and such false detection is the false alarm.

The method for performing the global raster probability update is as follows. An accumulated value (odd) of each raster on the static raster map at the current time point is an accumulated value (odd) of each raster at the previous time point multiplied by a function related to a vehicle traveling speed. The vehicle herein refers to the ego vehicle.

For a function f related to the vehicle traveling speed v (namely, one type of the foregoing dynamic target information), an example of a calculation method of the function f is as follows:

$$f = e^{-v \times 0.05} * 0.1 + 0.9.$$

v is an ego vehicle speed. Table 4 lists a relationship between f and v.

TABLE 4

| ′kilometers per hour (km/h) | f |
| --- | --- |
| 0 | 1 |
| 30 | 0.922313 |
| 60 | 0.904979 |
| 90 | 0.901111 |
| 120 | 0.900248 |

Figure 6:
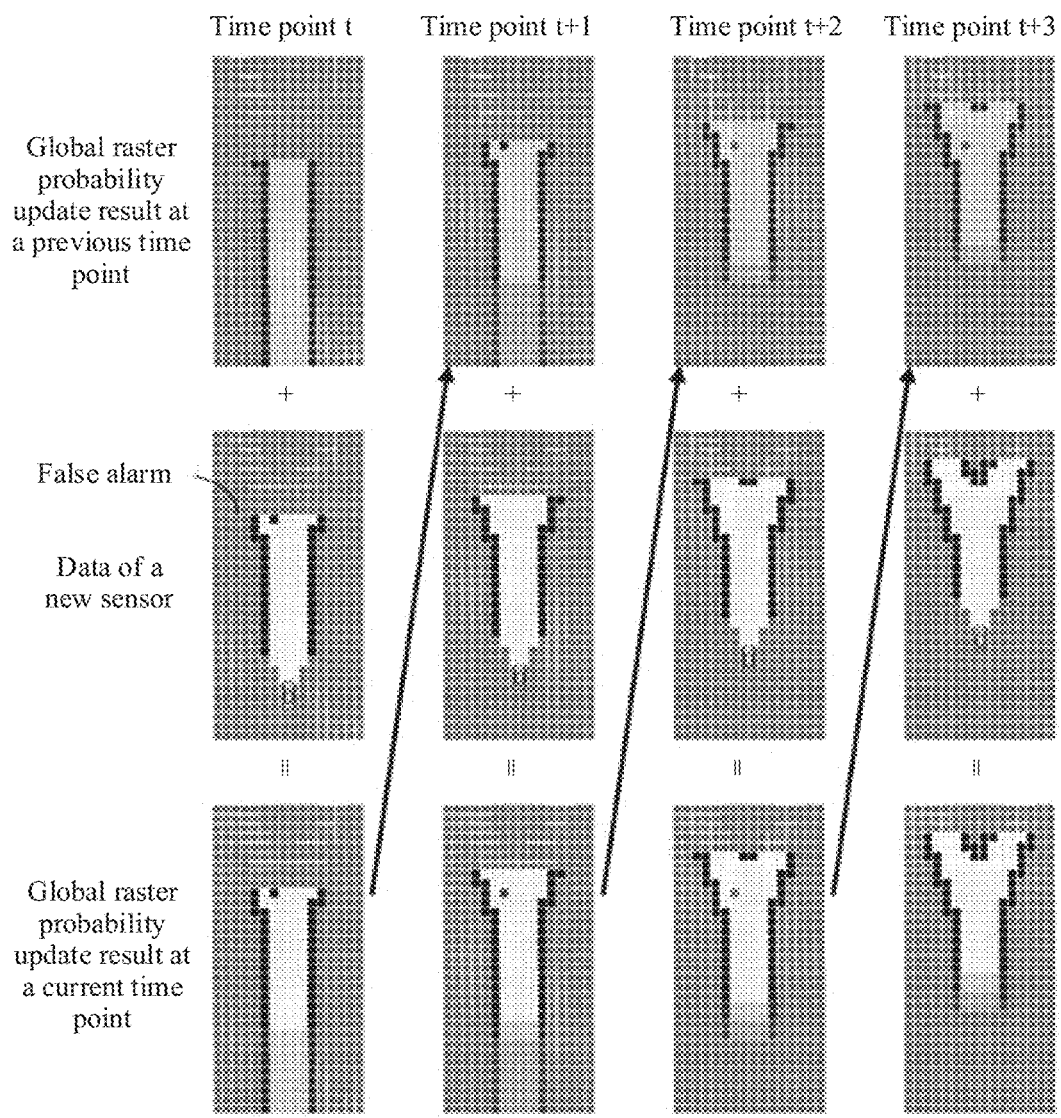
FIG. 6 is a schematic diagram of a global raster probability update method according to an embodiment of this application.

FIG. 6 shows an effect of the global raster probability update.

In FIG. 6, each column is a round of raster map update. A first row is a result obtained after the global raster probability update is performed on a raster map at the previous time point. A second row is data newly observed at the current time point. A third row is a result obtained by updating, through the data newly observed at the current time point, the raster map at the previous time point after a global probability attenuates.

A first column corresponding to a time point t is used as an example. A static raster map on the top of the column, namely, a static raster map in the first row of the first column, is actually a static raster map obtained after the global raster probability update is performed at a time point t−1. A static raster map in the middle of the first column, namely, a graph in the second row of the first column is a new static raster map observed at the time point t. Values of rasters corresponding to the static raster map in the first row of the first column and a static raster map in the second row of the first column are superimposed to obtain a static raster map at the bottom of the first column, namely, a static raster map in the third row of the first column. This map is a static raster map that probability update is performed at the time point t. The static raster map is output to the first row of a second column. To be specific, the static raster map, used as a start raster map at a time point t+1, is used to superimpose with a static raster map observed at the time point t+1, and this sequentially goes on in turn over time.

It can be seen that, as shown in FIG. 6, there is a false alarm detection point in the first column, in other words, in the static raster map that is newly observed at the time point t. As a result, an incorrect obstacle appears in the raster map at the time point t. However, after the global raster probability update in this embodiment of this application is performed, this false alarm does not occur again in subsequent detection (for example, a probability update result at a time point t+3 in the third row of a third column). Therefore, according to the method for performing the global raster probability update provided in this embodiment of this application, a probability of the incorrect obstacle can be gradually reduced and finally disappear as time goes by. In this way, accuracy of an output static raster map is improved, and perception precision is improved.

The following describes the coordinate conversion in step S2031a and the partial raster probability update in step S2031b.

Step S2031a includes performing coordinate system conversion on input information of an input module 203, in other words, converting both data and data included in the information into a same coordinate system. The coordinate conversion is required because input data is usually in different coordinate systems. However, during data processing, the data needs to be processed in the same coordinate system.

Feature data detected by a sensor is converted into a world coordinate system. It is assumed that an installation position and an angle of the sensor in the vehicle body coordinate system of the ego vehicle are $(x_t, y_t, \theta_t)$, and a position of a vehicle body of the ego vehicle in the world coordinate system is $(x_v, y_v, \theta_v)$. An algorithm for converting an original data position $(x_s, y_s)$ of the sensor into a position $(x_w, y_w)$ in the world coordinate system is as follows:

$$[x_w, y_w, 1]^T = T_v^w T_s^v [x_s, y_s, 1]^T.$$

A rotation matrix $T_s^v$ rom the sensor to the vehicle body of the ego vehicle is:

$$T_s^v = \begin{bmatrix} \cos\theta_t & -\sin\theta_t & x_t \\ \sin\theta_t & \cos\theta_t & y_t \\ 0 & 0 & 1 \end{bmatrix}$$

A rotation matrix $T_v^w$ from the vehicle body of the ego vehicle to the world coordinate system is:

$$T_s^w = \begin{bmatrix} \cos\theta_v & -\sin\theta_v & x_v \\ \sin\theta_v & \cos\theta_v & y_v \\ 0 & 0 & 1 \end{bmatrix}.$$

The following describes the partial raster probability update in step S2031b.

First, it should be noted that, after the data is converted into the same coordinate system in step S2031a, static feature data and undetermined data in the same coordinate system are used to perform an operation in step S2031b. Therefore, all data used in step S2031b is data that is in the same coordinate system and on which coordinate system unification is performed. This is not repeated in the following.

In this embodiment of this application, a manner of updating a partial raster probability includes updating the raster probability based on dynamic target information.

Further, the dynamic target information used herein includes a moving track of a dynamic target, which is a moving track of another moving carrier. The other moving carrier herein is another moving carrier that is except the ego vehicle and that is in an environment in which the ego vehicle is located or in a perception range of the ego vehicle, and may be another vehicle. The other moving carrier may also be a moving carrier of another type.

The following describes a cause, a scenario example, a calculation method, and an update effect that are of updating the raster probability based on the dynamic target information.

Similarly, the raster probability needs to be updated based on the dynamic target information because a false alarm phenomenon exists when a sensor detects a target. The dynamic target information, for example, a moving track of a moving target, can be used to reduce impact of a false alarm.

The false alarm is described in the above. An example is added here to better understand the false alarm. For example, in an automatic driving process of a self-driving vehicle, a millimeter wave radar may incorrectly identify a metal well cover on a road as an obstacle. Actually, this type of object does not affect normal traveling of the vehicle, and this false detection is the false alarm.

Figure 7:
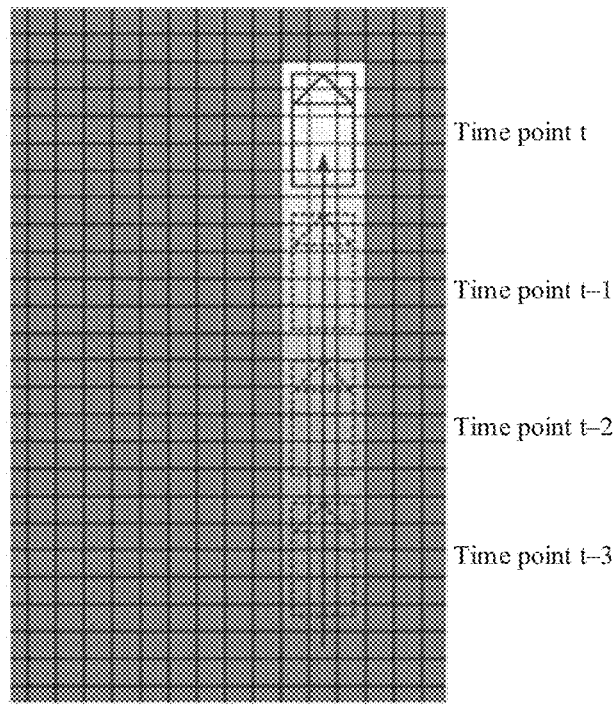
FIG. 7 is a schematic diagram of a partial raster probability update method according to an embodiment of this application.

Further, an effect of updating the raster probability based on the moving track of the dynamic target is shown in FIG. 7. The dynamic target herein is like the dynamic target in the above, and is the other moving carrier except the ego vehicle. To be specific, information of a static environment in which the ego vehicle is located is constructed through a moving track of the other moving carrier.

It is assumed that a historical static raster map shown in FIG. 7 is the static raster map at the time point t−1. A black square indicates a location of one of target vehicles at the time point t−1. A black dashed square indicates a historical location, for example, a historical location at a time point t−2, of the target vehicle relative to the time point t−1. A black arrow indicates a moving direction of the target vehicle. A lighter raster color in the figure indicates a higher idle probability. In other words, a probability that an area covered by the moving track of the moving target is an idle area is higher. A newer moving track indicates a higher idle probability. The time point t is the current time point. Compared with the current time point t, a raster covered by the moving target at the time point t−1 has a highest idle probability. It can be seen from FIG. 7 that, at the time point t−1, the idle probability is the highest and a color is the lightest. A color of an area that the target vehicle leaves for a longer time is deeper. Because the longer the target vehicle leaves the area, the more likely a change occurs in an environment. Therefore, a probability that the area is idle is lower. As shown in the figure, a color of an area covered by a historical moving track is deeper, because there is a higher probability that an obstacle appears in the area at the current time point. However, for a newer moving track, for example, a historical moving track on the top in the figure, a color of an area covered by the moving target is lighter, in other words, a newer moving track indicates a higher probability that the area is idle. This is easy to understand, because a shorter passing time of a vehicle indicates a lower possibility that another obstacle appears in an area that the vehicle passes through. However, a longer passing time of the vehicle indicates a higher possibility that the other obstacle appears in the area that the vehicle passes through.

A method for updating the raster probability based on the moving track of the dynamic target is as follows: an accumulated value (odd) of a raster in an area covered by the moving track of the dynamic target is an accumulated value (odd) of a raster that is in the area and that is at the previous time point plus a function related to old and new degrees of the moving track. For example:

$$f = \frac{t - t_i + T}{T} odd_{free}.$$

T is a time length of an entire moving track. $t_i$ is a current time point. t is a time point in the moving track. oddfree is an idle accumulated value. The idle accumulated value is a value that needs to be accumulated when it is detected that the raster is in an idle state, and is usually −0.1.

A specific algorithm may be as follows:

The moving track is defined as $\{p_{t_i}\}_{t=t_i-T \ldots t_i}$. Pt represents a location of the moving target at the time point t. $\{p_{t_i}\}_{t=t_i-T \ldots t_i}$ represents a track obtained by the moving target by moving forward for a time period T from the time point $t_i$. A probability that a raster c needs to accumulate is as follows:

$$f = \sum_{t=t_i-T}^{t_i} \frac{t - t_i + T}{T} odd_{free} A(p_t, c).$$

$A(P_t,c)$ indicates whether the raster c is in space occupied by the moving target at the time point t. If the raster c is in the space occupied by the moving target at the time point t, $A(P_t,c)$ is 1. Otherwise, $A(P_t,c)$ is 0.

Based on the foregoing calculation, a partially updated static raster map is obtained. The partially updated static raster map is a current static raster map obtained after a local update is performed on the historical static raster map, in other words, information that needs to be output by the static environment information construction module 203. The information may be output to the dynamic target construction module 205 to construct the dynamic target, and may also be output by the static environment construction module 203 as current static environment information, to be used as perception of a current static environment and to be output to a subsequent processing section for related processing. For example, the information is output to the cognitive layer for decision making and inference, and path planning that are for vehicle control.

The following describes a related method for estimating a road structure in step S2032.

The road structure is divided into two types: a road edge, for example, a road isolation bar, and the like, and an object above the ground, for example, a road sign, an advertising sign above the ground, an overcrossing, or the like.

Because road edge information can help filter out some false or invalid targets, the road structure is important for traveling of a self-driving vehicle. For example, because the road edge is a boundary that a vehicle cannot cross, in a normal case, a vehicle opposite to the road edge does not travel to a side of an ego vehicle. Therefore, false detection and a false alarm that occur outside the road edge can be filtered out. In addition, the road edge sometimes has a complex structure, for example, there are plants that may be falsely detected as a moving target. However, the falsely detected object actually overlaps the road edge, and it is impossible for a vehicle to "ride" on the road edge. Therefore, the road edge can be used to filter out similar false detection.

Figure 8:
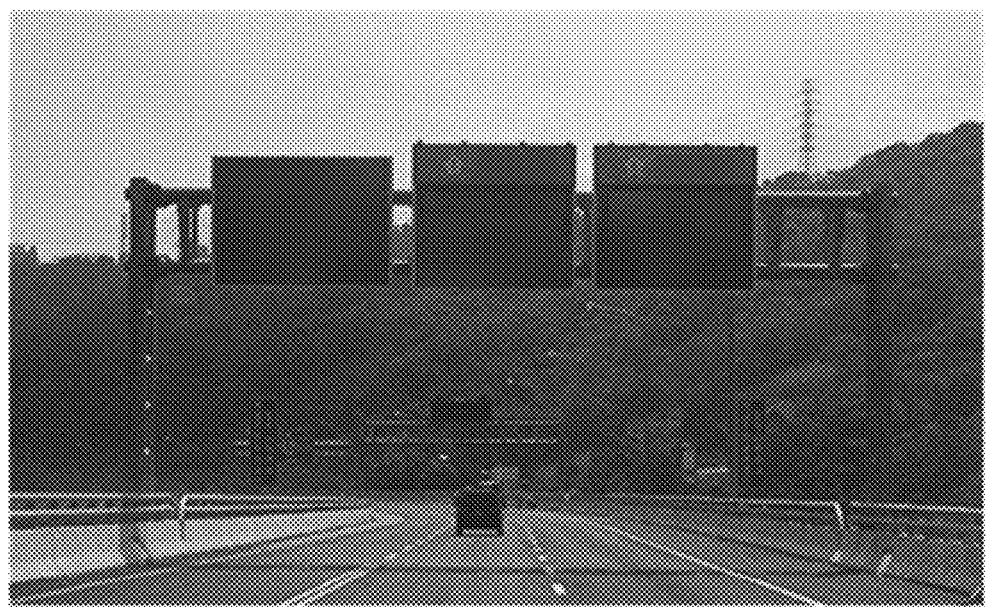
FIG. 8 is an example in which static environment information includes an object above the ground according to an embodiment of this application.

The object above the ground is an object that crosses a traveling route of the ego vehicle but is relatively high and do not affect passage of a vehicle. For example, as shown in FIG. 8, this is a road sign across an entire road on a highway. For some millimeter-wave radar that cannot detect height information, this type of road sign is the same as a wall. If it cannot be confirmed that the road sign is an object above the ground, a vehicle falsely brakes before the road sign. This easily causes a traffic accident.

The following describes how to construct the object above the ground based on the static feature data and the dynamic target information.

First, a point set including the object above the ground is extracted based on a peak value of a data histogram in an x-axis direction. The point set includes the static feature data at the current time point and a point cloud converted from the static raster map. Then, parameters of a model of an object above the ground are calculated through the point set and an optimization function, to obtain a to-be-determined object above the ground. Finally, it is determined that the object is the object above the ground through height information of the point set or if another dynamic target passes through the to-be-determined object above the ground.

In other words, if a moving track of the dynamic target intersects a line segment of a model of a to-be-determined object above the ground, in other words, an equation has a solution, the object is determined as the object above the ground. A specific method example is as follows.

The object above the ground may be represented by a line segment model. For example, a start point and an end point of a line segment of the object above the ground are respectively:

$$(x_{start}, y_{start}) \text{ and } (x_{end}, y_{end}).$$

A corresponding line segment model is as follows:

$$x = f(y) = \frac{(y_{start} - y)x_{end} + (y - y_{end})x_{start}}{y_{start} - y_{end}}, y \in [y_{start}, y_{end}].$$

The moving track is defined as $\{p_t\}_{t=t_i-T \ldots t_i}$. The moving track may be simplified as a line segment, namely, $$y = f(x) = \frac{(x_{t_i-T} - x)y_{t_i} + (x - x_{t_i})y_{t_i-T}}{x_{t_i-T} - x_{t_i}}, x \in [x_{t_i-T} - x_{t_i}],$$

between a start point $p_{t_i-T}=(x_{t_i-T}, y_{t_i-T})$ and an end point $p_{t_i}=(x_{t_i}, y_{t_i})$. An intersection point of two straight lines is calculated according to the following formula:

$$\begin{cases} x = \frac{(y_{start} - y)x_{end} + (y - y_{end})x_{start}}{y_{start} - y_{end}} \\ y = \frac{(x_{t_i-T} - x)y_{t_i} + (x - x_{t_i})y_{t_i-T}}{x_{t_i-T} - x_{t_i}} \end{cases}.$$

If there is an intersection point $(x_c, y_c)$ between the two straight lines, and the intersection point is within a range of the two line segments, to be specific, $x_c \in [x_{start}, x_{end}] \cap [x_{t_j-T}, x_{t_j}]$ and $y_c \in [y_{start}, y_{end}] \cap [y_{t_j-T}, y_{t_j}]$, it is considered that the moving track of the dynamic target intersects the line segment of a model of the to-be-determined object above the ground (in other words, the equation has the solution), and the object above the ground can be determined. The moving track of the moving target described herein may be a moving track of any moving target except the ego vehicle.

According to the foregoing method, the static environment construction module 203 obtains, through construction, the static environment information based on the static feature data and the dynamic target information. The static environment information may include the static raster map and the road structure information.

It should be noted that, in the foregoing step, step S2032 is an optional step. To be specific, if the static environment construction module 203 does not perform step S2032, in other words, the static environment construction module 203 does not output the road structure information, so that a perception result of the perception layer for some static environments is lost. However, this does not affect the static environment construction module 203 constructing the static raster map in this embodiment of this application. However, because some road structure information including the object above the ground may be obtained by combining the static feature data and the dynamic target information (for example, the moving track of the moving target) in step S2032, a perception capability can be better improved by performing step S2032, to help the self-driving vehicle better perceive the static environment information.

After the work of the static environment construction module 203 is described, the work of the dynamic target construction module 205 is described below.

The dynamic target construction module 205 is configured to construct the dynamic target based on the dynamic feature data and the static environment information.

It should be noted that, as described above, after the data preprocessing module 201 performs the data separation, obtained data may further include the undetermined data in addition to the dynamic feature data and the static feature data. The undetermined data is the feature data that is not determined as the dynamic feature data or the static feature data. In some embodiments, the undetermined data may be discarded. However, to more accurately reflect a real situation of an environment in which the moving carrier is located, the undetermined data is retained in some other embodiments and enters the module 203 together with the static feature data, to construct the static environment information. The undetermined data may further enter the module 205 together with the dynamic feature data, to construct the dynamic target information.

In an implementation presented below, it describes the dynamic target construction module 205 that performs related processing by using the dynamic feature data and the undetermined data.

Input information of the dynamic target construction module 205 may include a motion status of the ego vehicle, the dynamic feature data, historical moving target information, the static environment information, the undetermined data, and the like. The output information may include a historical track, and attributes such as a position, a speed, a size, an orientation, and a category that are of a moving target. The static environmental information may include a road edge, and/or an object above the ground.

The dynamic target construction module 205 may be further configured to implement the following method of clustering in step S2051, filtering of the dynamic target in the static environment in step S2052, tracking of the dynamic target in step S2053.

After work of the data preprocessing module 201, output data is the dynamic feature data, the static feature data, and the undetermined data. The dynamic feature data and the undetermined data are used by the dynamic target construction module 205. First, the dynamic target construction module 205 performs the clustering described in step S2051 on the dynamic feature data and the undetermined data, to obtain one or more clustering centers. Each clustering center includes one group of clustering feature data, and each group of clustering feature data is considered as a new possible moving target. An identifier (ID) is assigned to the target, and the target is marked as an immature moving target. A next step S2052 is performed. Feature data that is not clustered is a noise point and is discarded.

Next, step S2052 needs to be performed to filter the dynamic target in the static environment.

Based on one or more immature motion targets obtained through the foregoing clustering, if an immature motion target is located outside the road edge, or if the immature motion target overlaps the road edge, the immature motion target is considered as an invalid motion target, in other words, a possibility that the target is a real moving target is relatively low.

A specific method includes projecting all feature data included in the immature moving target into a coordinate system to which the static environment information belongs. The static environment information includes the road edge, to determine a relationship between the immature moving target and the road edge.

It is assumed that $(x_k, y_k)$ is a position of an immature moving target k, and $y=f(x)$ is a road edge model.

If the immature moving target k is outside the road edge, in other words, $|f(x_k)|>y_k$, the target k is invalid.

If the immature moving target k is within the road edge, it is determined that a distance between the target k and the road edge is if $|f(x_k)-y_k|$. If the distance is less than a general body size (for example, 2.5 m), the immature moving target is considered as an invalid target, in other words, if being very close to the road edge and being within the road edge, the target k is also considered as an invalid moving target.

The invalid moving target is filtered out through the filtering in step S2052. A possibility that remaining immature moving targets may be considered as real moving targets is relative high. This part of immature moving targets may be used as an output result of the dynamic object construction module 205, to be output to the static environment construction module 203. Alternatively, this part of immature moving targets may also be output to the cognitive layer, the human-computer interaction interface, or the like.

In a possible implementation, the foregoing static environment information may further include the object above the ground, and the foregoing remaining part of immature moving targets may be used for further processing, including determining a relationship between the remaining part of immature moving targets and the object above the ground, to determine whether the remaining part of the immature moving targets are objects above the ground.

Because the undetermined data is used, it is very likely that data that should be the static feature data exists in the undetermined data. However, because the data is not identified, the data enters the dynamic target construction module 205 as the undetermined data. Therefore, in a process in which the module 205 performs dynamic target construction, it may be found that some possible moving targets are actually static obstacles. This is a reason why this implementation needs to be performed, and a specific method is as follows.

It is assumed that $(x_k, y_k)$ is a location of the target k, and $x=f(y)|y\in[y_1,y_2]$ is a model of an object above the ground. If $y_1<y_k<y_2 \wedge |f(y_k)-x_k|<\delta$ ($\delta$ is usually a vehicle length that is 5 m), it is considered that the target is the object above the ground, and the target is marked as the object above the ground. In this case, the remaining immature targets are considered as the real moving targets, and related information of the remaining immature targets is output by the model 205 as moving target information.

Figure 9:
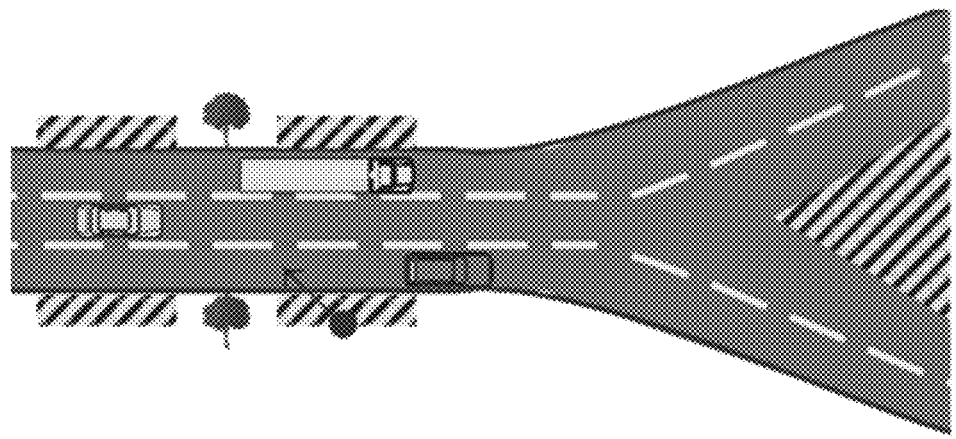
FIG. 9 is a schematic diagram of constructing dynamic target information based on reference static environment information according to an embodiment of this application.

As shown in FIG. 9, a black point represents a false alarm that is detected by a sensor and that is outside a road edge, and an arrow is a speed of a detected false alarm target. If the false alarm is not filtered out, a self-driving system considers that the target is moving towards an ego vehicle, which poses a threat to the ego vehicle, and triggers an action such as braking or avoidance. However, according to the method in the step S2052, the false alarm may be filtered out. Therefore, safety of the self-driving vehicle is ensured.

The tracking of the dynamic target in step S2053 may be implemented through an existing multi-target tracking method based on threshold correlation and Kalman filtering, to continuously track a determined moving target. If the moving target is no longer associated within a first preset time period or a first preset frame, the moving object is suspended. If the moving target is still not associated within a second preset time period or a second preset frame, the moving object is deleted. If the moving target is re-associated within a third preset time period or a third preset frame, the moving target is restored. Values of the first preset time period, the second preset time period, and the third preset time period may be set based on experience. A relationship between three preset values is not limited. For example, the three preset time periods may be the same or different from each other. A same principle is applied to the first preset frame, the second preset frame, and the third preset frame. Details are not described again. The association described herein may be the same as the manner of associating the historical dynamic target mentioned in step S2012 in the foregoing embodiment of this application, and details are not described herein again.

Figure 10:
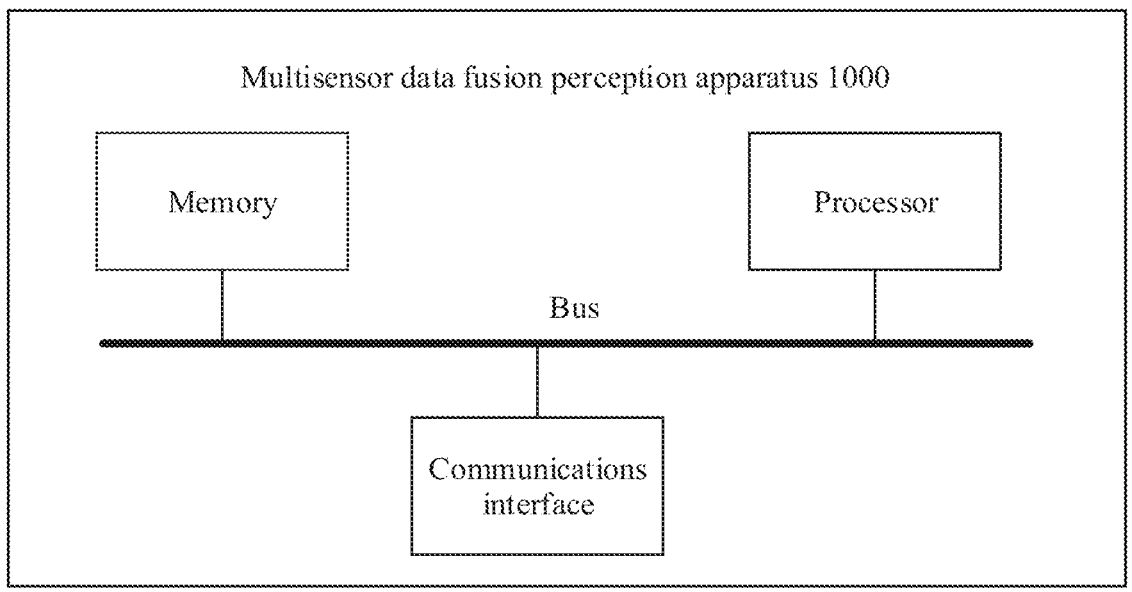
FIG. 10 is a schematic structural diagram of a multisensor data fusion perception apparatus according to an embodiment of this application.

FIG. 10 is a schematic diagram of a hardware structure of a multisensor data fusion perception apparatus 1000 according to an embodiment of this application.

The multisensor data fusion perception apparatus 1000 shown in FIG. 10 includes a memory, a processor, a communications interface, and a bus. Communication connections between the memory, the processor, and the communications interface are implemented through the bus.

The multisensor data fusion perception apparatus 1000 may be a computer device.

The multisensor data fusion perception apparatus 1000 may be configured to perform a function of each module in the multisensor data fusion perception apparatus 200.

In the multisensor data fusion perception apparatus 1000, the memory may be a read-only memory (ROM), a static storage device, a dynamic storage device, or a random-access memory (RAM). The memory may store a program. When the program stored in the memory is executed by the processor, the processor and the communications interface are configured to perform the steps of the multisensor data fusion perception method in the embodiments of this application.

The processor may be a general-purpose central processing unit (CPU), a microprocessor, an application-specific integrated circuit (ASIC), a graphics processing unit (GPU), or one or more integrated circuits. Alternatively, the processor may include both a central processing unit and a processor (hereinafter referred to as a neural network processing unit) that may be configured to perform neural network processing. In other words, a function of the processor is jointly performed by combining the central processing unit and the neural network processing unit. The processor is configured to execute a related program to implement a function that needs to be performed by each module in the multisensor data fusion perception apparatus in the embodiments of this application, or perform the multisensor data fusion perception method in the method embodiments of this application.

The processor may also be an integrated circuit chip and has a signal processing capability. In an implementation process, steps of an action recognition method in this application may be implemented through an integrated logic circuit of hardware in the processor or an instruction in a form of software. The processor may be a general purpose processor, a digital signal processor (DSP), an ASIC, a field-programmable gate array (FPGA) or another programmable logical device, a discrete gate or transistor logic device, or a discrete hardware component. The processor may implement or perform the methods, the steps, and logical block diagrams that are disclosed in the embodiments of this application. The general purpose processor may be a microprocessor or any regular processor or the like. Steps of the methods disclosed with reference to the embodiments of this application may be directly executed and accomplished by a hardware decoding processor, or may be executed and accomplished by a combination of hardware and software modules in the decoding processor. A software module may be located in a mature storage medium in the art, such as a RAM, a flash memory, a ROM, a programmable ROM (PROM), an electrically erasable PROM (EEPROM), or a register. The storage medium is located in the memory. The processor reads information in the memory, and completes, in combination with the hardware of the processor, a function that needs to be performed by a module included in the multisensor data fusion perception apparatus in the embodiments of this application, or performs the multisensor data fusion perception method in the method embodiments of this application.

The communications interface uses a transceiver apparatus, for example but not for limitation, a transceiver, to implement communication between the apparatus 1000 and another device or a communications network. For example, data collected by a plurality of sensors may be obtained through the communications interface.

The bus may include a path for transmitting information between components (for example, the memory, the processor, and the communications interface) of the apparatus 1000.

It should be noted that although only the memory, the processor, and the communications interface are shown in the apparatus 1000 shown in FIG. 10, in a specific implementation process, a person skilled in the art should understand that the apparatus 1000 further includes other components necessary for implementing a normal operation. In addition, based on a specific requirement, a person skilled in the art should understand that the apparatus 1000 may further include hardware components for implementing other additional functions. In addition, a person skilled in the art should understand that the apparatus 1000 may alternatively include only devices required for implementing the embodiments of this application, but does not necessarily include all the devices shown in FIG. 10.

A person of ordinary skill in the art may be aware that, in combination with the examples described in the embodiments disclosed in this specification, modules and method steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical units, may be located in one position, or may be distributed on a plurality of network units. Some or all the modules may be selected based on actual needs to achieve the objectives of the solutions of the embodiments.

In addition, functional modules in this application may be integrated into one processing module, or each of the modules may exist alone physically, or two or more modules are integrated into one module.

When the functions are implemented in the form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
receiving feature data from a plurality of types of sensors;
performing data classification on the feature data to obtain static feature data and dynamic feature data;
obtaining, based on the dynamic feature data, reference dynamic target information;
constructing current static environment information based on the static feature data and the reference dynamic target information;
obtaining, based on the static feature data, reference static environment information;
constructing current dynamic target information based on the dynamic feature data and the reference static environment information; and
outputting the current static environment information and the current dynamic target information,
wherein the feature data comprises millimeter-wave radar detection data and non-millimeter-wave radar detection data, and
wherein performing the data classification on the feature data further comprises:
performing the data classification on the millimeter-wave radar detection data to obtain millimeter-wave radar dynamic detection data and millimeter-wave radar static detection data; and
performing, based on the millimeter-wave radar dynamic detection data and the millimeter-wave radar static detection data, the data classification on the non-millimeter-wave radar detection data to obtain dynamic non-millimeter-wave feature data and static non-millimeter-wave feature data,
wherein the dynamic feature data comprises the millimeter-wave radar dynamic detection data and the dynamic non-millimeter-wave feature data, and
wherein the static feature data comprises the millimeter-wave radar static detection data and the static non-millimeter-wave feature data.

2. The method of claim 1, wherein obtaining the reference dynamic target information further comprises further obtaining the reference dynamic target information based on the dynamic feature data and historical static environment information.

3. The method of claim 1, wherein obtaining the reference static environment information further comprises further obtaining the reference static environment information based on the static feature data and historical dynamic target information.

4. The method of claim 1, wherein the sensors are mounted on a first moving carrier that is located in a first environment, wherein the reference dynamic target information comprises a moving track of a second moving carrier that is located in the first environment, wherein the current static environment information comprises a current static raster map of the first environment, wherein the current static raster map is a data format describing static obstacle distribution in the first environment, and wherein constructing the current static environment information further comprises:
unifying the static feature data into unified static feature data in a single coordinate system; and
performing a local update on a historical static raster map of the first environment based on the unified static feature data and the moving track to obtain the current static raster map, wherein the local update comprises updating a value of a target raster on the historical static raster map, and wherein the target raster is covered by the second moving carrier.

5. The method of claim 4, wherein before constructing the current static environment information, the method further comprises:
obtaining, from the sensors, a motion status of the first moving carrier, wherein the motion status comprises a moving speed of the first moving carrier;
performing, based on the moving speed, a global update on a value of each raster on the historical static raster map to obtain an updated historical static raster map, wherein the historical static raster map comprises a static raster map at a previous time point of a current time point, wherein the historical static raster map is an initial static raster map when the previous time point is a start time point, and wherein a value of each raster on the initial static raster map is a preset value; wherein
the current static raster map is obtained by performing the local update on the updated historical static raster map based on the unified static feature data and the moving track.

6. The method of claim 1, wherein the sensors are mounted on a first moving carrier that is located in a first environment, wherein the reference dynamic target information comprises a moving track of a second moving carrier that is located in the first environment, wherein the current static environment information further comprises road structure information in the first environment, and wherein constructing the current static environment information further comprises constructing the road structure information based on the static feature data and the moving track.

7. The method of claim 6, wherein the reference static environment information comprises the road structure information, and wherein constructing the current dynamic target information further comprises constructing the current dynamic target information based on the dynamic feature data and the road structure information.

8. The method of claim 7, wherein the road structure information comprises a road edge, and wherein constructing the current dynamic target information further comprises:
clustering the dynamic feature data to obtain one or more clustering centers, wherein each of the one or more clustering centers represents a possible dynamic target; and
excluding an invalid clustering center in the one or more clustering centers based on the road structure information, wherein the invalid clustering center is either located outside the road edge or is overlapped with the road edge.

9. An apparatus comprising:
a memory configured to store programming instructions; and
a processor coupled to the memory, wherein when executed by the processor, the programming instructions cause the processor apparatus to be configured to:
receive feature data from a plurality of types of sensors;
perform data classification on the feature data to obtain static feature data and dynamic feature data;
obtain, based on the dynamic feature data, reference dynamic target information;
construct current static environment information based on the static feature data and the reference dynamic target information;
obtain, based on the static feature data, reference static environment information;
construct current dynamic target information based on the dynamic feature data and the reference static environment information; and
output the current static environment information and the current dynamic target information,
wherein the feature data comprises millimeter-wave radar detection data and non-millimeter-wave radar detection data, and
wherein the programming instructions further cause the apparatus to be configured to:
perform the data classification on the millimeter-wave radar detection data to obtain millimeter-wave radar dynamic detection data and millimeter-wave radar static detection data; and
perform, based on the millimeter-wave radar dynamic detection data and the millimeter-wave radar static detection data, the data classification on the non-millimeter-wave radar detection data to obtain dynamic non-millimeter-wave feature data and static non-millimeter-wave feature data,
wherein the dynamic feature data comprises the millimeter-wave radar dynamic detection data and the dynamic non-millimeter-wave feature data, and
wherein the static feature data comprises the millimeter-wave radar static detection data and the static non-millimeter-wave feature data.

10. The apparatus of claim 9, wherein when executed by the processor, the programming instructions cause the apparatus to be configured to obtain the reference dynamic target information based on the dynamic feature data and historical static environment information.

11. The apparatus of claim 9, wherein when executed by the processor, the programming instructions cause the apparatus to be configured to obtain the reference static environment information based on the static feature data and historical dynamic target information.

12. The apparatus of claim 9, wherein the sensors are mounted on a first moving carrier that is located in a first environment, wherein the reference dynamic target information comprises a moving track of a second moving carrier that is located in the first environment, wherein the current static environment information comprises a current static raster map of the first environment, wherein the current static raster map is a data format describing static obstacle distribution in the first environment, and wherein when executed by the processor, the programming instructions further cause the apparatus to be configured to:
unify the static feature data into unified static feature data in a single coordinate system; and
perform a local update on a historical static raster map of the first environment based on the unified static feature data and the moving track to obtain the current static raster map, wherein the local update comprises updating a value of a target raster on the historical static raster map, and wherein the target raster is covered by the second moving carrier.

13. The apparatus of claim 12, wherein when executed by the processor, the programming instructions further cause the apparatus to be configured to:
obtain, from the sensors, a motion status of the first moving carrier, wherein the motion status comprises a moving speed of the first moving carrier; and
perform, based on the moving speed, a global update on a value of each raster on a historical static raster map to obtain an updated historical static raster map, wherein the historical static raster map comprises a static raster map at a previous time point of a current time point, wherein the historical static raster map is an initial static raster map when the previous time point is a start time point, wherein a value of each raster on the initial static raster map is a preset value, and wherein the current static raster map is obtained by performing the local update on the updated historical static raster map based on the unified static feature data and the moving track.

14. The apparatus of claim 9, wherein the sensors are mounted on a first moving carrier that is located in a first environment, wherein the reference dynamic target information comprises a moving track of a second moving carrier that is located in the first environment, wherein the current static environment information further comprises road structure information in the first environment, and wherein when executed by the processor, the programming instructions further cause the apparatus to be configured to construct the road structure information based on the static feature data and the moving track.

15. The apparatus of claim 14, wherein the reference static environment information comprises the road structure information, and wherein when executed by the processor, the programming instructions further cause the processor apparatus to be configured to further construct the current dynamic target information based on the dynamic feature data and the road structure information.

16. The apparatus of claim 15, wherein the road structure information comprises a road edge, and wherein when executed by the processor, the programming instructions further cause the apparatus to be configured to:
cluster the dynamic feature data to obtain one or more clustering centers, wherein each of the one or more clustering centers represents a possible dynamic target; and
exclude an invalid clustering center in the one or more clustering centers based on the road structure information, wherein the invalid clustering center is either located outside the road edge or is overlapped with the road edge.

17. The apparatus of claim 9, wherein when executed by the processor, the programming instructions further cause the apparatus to be configured to:
associate the feature data with a historical dynamic target to obtain dynamic associated data, wherein the historical dynamic target is in an environment in which a first moving carrier is located at a previous time point of a current time point, wherein the sensors are mounted on the first moving carrier;
observe, using the sensors, a status of the environment;
determine data in the feature data and falling at a location at which the historical dynamic target is located as the dynamic associated data;
set the dynamic associated data as the dynamic feature data;
filter out the dynamic associated data from the feature data to obtain second feature data; and
perform the data classification on the second feature data.

18. A computer program product comprising computer-executable instructions that are stored on a non-transitory computer-readable storage medium and that, when executed by a processor, cause an apparatus to:
receive feature data from a plurality of types of sensors;
perform data classification on the feature data to obtain static feature data and dynamic feature data;
obtain, based on the dynamic feature data, reference dynamic target information;
construct current static environment information based on the static feature data and the reference dynamic target information;
obtain, based on the static feature data, reference static environment information;
construct current dynamic target information based on the dynamic feature data and the reference static environment information; and
output the current static environment information and the current dynamic target information,
wherein the feature data comprises millimeter-wave radar detection data and non-millimeter-wave radar detection data, and
wherein when executed by the processor, the computer-executable instructions further cause the apparatus to:
perform the data classification on the millimeter-wave radar detection data to obtain millimeter-wave radar dynamic detection data and millimeter-wave radar static detection data; and
perform, based on the millimeter-wave radar dynamic detection data and the millimeter-wave radar static detection data, the data classification on the non-millimeter-wave radar detection data to obtain dynamic non-millimeter-wave feature data and static non-millimeter-wave feature data,
wherein the dynamic feature data comprises the millimeter-wave radar dynamic detection data and the dynamic non-millimeter-wave feature data, and
wherein the static feature data comprises the millimeter-wave radar static detection data and the static non-millimeter-wave feature data.

19. The computer program product of claim 18, wherein when executed by the processor, the computer-executable instructions cause the apparatus to be configured to obtain the reference dynamic target information based on the dynamic feature data and historical static environment information.

20. The computer program product of claim 18, wherein when executed by the processor, the computer-executable instructions cause the apparatus to be configured to obtain the reference static environment information based on the static feature data and historical dynamic target information.

* * * * *